United States Patent
Erlingsson et al.

(10) Patent No.: US 7,574,709 B2
(45) Date of Patent: Aug. 11, 2009

(54) VEX-VIRTUAL EXTENSION FRAMEWORK

(75) Inventors: Ulfar Erlingsson, San Francisco, CA (US); Edward P. Wobber, Menlo Park, CA (US); Paul Barham, Cambridge (GB); Thomas Roeder, Ithaca, NY (US)

(73) Assignee: Microsoft Corporation, Redmond, WA (US)

( * ) Notice: Subject to any disclaimer, the term of this patent is extended or adjusted under 35 U.S.C. 154(b) by 1143 days.

(21) Appl. No.: 10/837,971

(22) Filed: Apr. 30, 2004

(65) Prior Publication Data

US 2005/0246718 A1 Nov. 3, 2005

(51) Int. Cl.
*G06F 3/00* (2006.01)
*G06F 9/00* (2006.01)
*G06F 9/455* (2006.01)
*G06F 11/00* (2006.01)

(52) U.S. Cl. ............... 719/310; 713/2; 718/1; 714/15

(58) Field of Classification Search ........ 719/319, 719/310; 713/2; 718/1; 714/15
See application file for complete search history.

(56) References Cited

U.S. PATENT DOCUMENTS

| | | | | |
|---|---|---|---|---|
| 4,649,479 A | * | 3/1987 | Advani et al. | ........ 718/1 |
| 5,063,499 A | | 11/1991 | Garber | |
| 5,734,865 A | * | 3/1998 | Yu | ........ 709/250 |
| 5,761,477 A | | 6/1998 | Wahbe et al. | |
| 5,768,593 A | | 6/1998 | Walters et al. | |
| 5,790,850 A | | 8/1998 | Natu | ........ 395/652 |
| 5,867,702 A | | 2/1999 | Lee | ........ 395/651 |
| 5,915,087 A | | 6/1999 | Hammond et al. | ........ 395/187.01 |
| 6,044,442 A | * | 3/2000 | Jesionowski | ........ 711/153 |
| 6,115,054 A | | 9/2000 | Giles | |
| 6,158,000 A | | 12/2000 | Collins | ........ 713/1 |
| 6,397,242 B1 | | 5/2002 | Devine et al. | |

(Continued)

FOREIGN PATENT DOCUMENTS

JP 2001/100983 4/2001

(Continued)

OTHER PUBLICATIONS

Swift, Michael M., et al., "Improving the Reliability of Commodity Operating Systems", Proceedings of the 19th ACM Symposium on Operating Systems Principles, Oct. 2003, 16 pages.

(Continued)

*Primary Examiner*—Lechi Truong
(74) *Attorney, Agent, or Firm*—Woodcock Washburn LLP

(57) ABSTRACT

Extensions to operating systems or software applications can be hosted in virtual environments to fault isolate the extension. The virtual environment in which extensions designed to control hardware devices can safely execute can be efficiently created during an initial startup sequence of a host environment by indicating to the host environment that a second processing unit is present in the computing system allowing the host environment to create a coherent state. A virtual process, especially a virtual operating system process running on a virtual machine, can be efficiently started by the created coherent state. A coherent state can be created when an operating system starts up and the appropriate parameters are observed and saved. Alternatively, an operating system of the host environment can create the coherent state by receiving indication of the second processing unit during the boot process.

12 Claims, 7 Drawing Sheets

U.S. PATENT DOCUMENTS

| | | | |
|---|---|---|---|
| 6,496,847 | B1 | 12/2002 | Bugnion et al. |
| 6,546,431 | B1* | 4/2003 | Brown et al. ................ 719/313 |
| 6,795,912 | B1* | 9/2004 | Itoh et al. ...................... 713/2 |
| 6,944,699 | B1* | 9/2005 | Bugnion et al. ............. 710/269 |
| 7,325,233 | B2* | 1/2008 | Kuck et al. ................. 718/103 |
| 7,370,324 | B2* | 5/2008 | Goud et al. ..................... 718/1 |
| 2002/0162024 | A1 | 10/2002 | Cunchon et al. ............ 713/201 |
| 2005/0132367 | A1* | 6/2005 | Tewari et al. ................... 718/1 |

FOREIGN PATENT DOCUMENTS

| | | |
|---|---|---|
| WO | WO 01/60019 A1 | 8/2001 |

OTHER PUBLICATIONS

Swift, Michael, et al., "Improving the Reliability of Commodity Operating Systems", Slide Presentation, Jun. 2002, 53 pages.

Nooks: Improving the Reliability of Commodity Operating Systems with Lightweight Kernel Protection Domains, retrieved from cs.washington.edu/homes/mikesw/nooks on Apr. 30, 2004, 3 pages.

Hunt, Galen C., "Creating *User-Mode Device Drivers with a Proxy*", *in Proceedings* of the 1*st* USENIX Windows NT Workshop, Seattle WA, Aug. 1999, pp. 1-6.

Swift, Michael, M., "Nooks: An Architecture for Reliable Device Drivers", *Department of Computer Science and Engineering*, University of Washington, 6 pages.

Swift, Mike, et al., "Nooks: Safe Device Drivers with Lightweight Kernel Protection Domains", Slide Presentation, University of Washington, 20 pages.

Lynch, Michael, "The Boot Process-Windows XP", retrieved from qvtc.commnet.edu/classes/csc277/boot-xp.html on Apr. 30, 2004, 8 pages.

Russinovich, Mark, "Stop the bad guys before they reach your gateway", Inside the Boot Process, Part 1, InstantDoc #3952, Nov. 1998, retrieved from winntmag.com/Article/Print.cfm?ArticleID=3952 (6 pages).

Russinovich, Mark, "Password Management", Inside the Boot Process, Part 2, InstantDoc #4711, Jan. 1999, retrieved from winntmag.com/Article/Print.cfm?ArticleID=4711.

"Using Direct I/O", Kernel-Mode Driver Architecture: Windows DDK, retrieved from msdn.microsoft.com/library/en-us/kmarch/hh/kmarch/iputoput_46xz.asp?frame=true on Apr. 30, 2004 (1 page).

"Methods for Accessing Data Buffers" Kernel-Mode Driver Architecture: Windows DDK, retrieved from msdn.microsoft.com/library/en-us/kmarch/hh/kmarch/iputoput_3m07.asp?frame=true.

"Using Buffered I/O", Kernel-Mode Driver Architecture: Windows DDk, retrieved from msdn.microsoft.com/library/en-us/kmarch/hh/kmarch/iputoput_1ulj.asp?frame=true.

"Using Direct I/O with DMA" Kernel-Mode Driver Architecture: Windows DDk, retrieved from msdn.microsoft.com/library/en-us/kmarch/hh/kmarch/iputoput_0gx.4.asp?frame=true.

"Using Direct I/O with PIO", Kernel-Mode Driver Architecture: Windows DDk, retrieved from msdn.microsoft.com/library/en-us/kmarch/hh/kmarch/iputoput_8x47.asp?frame=true.

Buschmann, F. et al., "Pattern-Oriented Software Architecture", *Wiley Series in Software Design Patterns*, 1996, 1, 221-224, 261-276, XP-002342463.

Gamma, E. et al., "Design Patterns, Elements of Reusable Object-Oriented Software", *Addison-Wesley*, 1994, XP-002342462.

Ivens, K., "Windows 2000: The Complete Reference", 2000, The McGraw-Hill Companies, 14 pages.

Tanenbaum, A.S., "Modern Operating Systems", 2001, $2^{nd}$ Edition, 69 pages, XP 002356990.

\* cited by examiner

VEX-VIRTUAL EXTENSION FRAMEWORK

RELATED APPLICATION

This application is related to U.S. application Ser. No. 10/837,103 entitled "Providing Direct Access To Hardware From A Virtual Environment", filed on Apr. 30, 2004, now abandoned.

FIELD OF THE INVENTION

This invention relates generally to fault tolerant extensions and, more particularly, relates to a system and method for providing a fault isolated virtual environment for extensions.

BACKGROUND

An increasingly popular mechanism for extending operating systems or applications is the use of extensions that can provide additional functionality and can be delivered and invoked on an individual basis. Modern operating systems, for example, rely on extensions provided by hardware manufacturers to interface between the hardware components made by the hardware manufacturers and the operating system software. In such a manner, an operating system author need only provide general hardware support, and need not attempt to support every conceivable hardware device. When a new hardware device is added to a computing system on which the operating system is running, an extension specifically designed to interface between the new hardware device and the operating system can be provided by the hardware manufacturer and can be used by the operating system to control the new hardware device and provide the user access to the functionality of the new hardware device.

In addition to the operating system, many other software applications rely on extensions to provide additional functionality while reducing the complexity of the host application. For example, a web browser application can rely on extensions to provide users the ability to interpret or interact with a wide variety of data types. Thus, a web browser need only provide the ability to handle limited types of data, such as web pages written in the HyperText Markup Language (HTML) or images encoded using the Joint Photographic Experts Group (JPEG) encoding format. Web pages that require additional capabilities of the browser application can rely on custom extensions for the browser application to provide the required capabilities. For example, a web page author that wishes to use images encoded in a little-used format can provide an extension that can understand the particular image format and can interface with the web browser to enable the web browser to display images encoded using that format.

Other applications can also use extensions to provide increased functionality. For example, image processing applications can use extensions provided by a variety of artists to allow users access to many different artistic image processing algorithms developed by those artists. An image processing program can, therefore, provide basic image editing features, such as color and contrast controls. More complex features, such as an effect that appears to transform a photograph into an oil painting, can be provided by separately available extensions. In such a manner, users of image processing applications can individually select which extensions are most appropriate for their requirements and can choose to install only those extensions that may be useful given those requirements.

In general, extensions interact with host software applications through various application program interfaces (APIs). An API defines the manner in which various features or abilities are to be accessed. Thus, two components are said to interact through an API when one component comprises code and data for implementing a particular function and provides that the function is invoked in the manner defined by the API, and a second component requests the function in the manner defined by the API.

The interaction between an extension and a host software application generally occurs through two types of APIs: service APIs and support APIs. Support APIs can be implemented by the host software application, operating system, or any other software that can be used by the extension to access functionality provided by the host software application. Furthermore, support APIs can be layered, or stacked, such that some support APIs may rely on further support APIs to perform requested functions. Service APIs, on the other hand, can be implemented by the extension and can be used by the host software application to access the functionality provided by the extension. As an example, an extension to a web browser that enables the web browser to display images encoded in a particular format can expose service APIs that the web browser can use to pass the image data to the extension and request that the extension interpret the image data, while the web browser can provide support APIs that can provide basic services that the extension can request from the web browser.

Many extensions, especially operating system extensions, such as those designed to interface with hardware devices, can rely on multiple support APIs to appropriately interface with hardware. Many hardware devices that can be added to a modern computing device physically interface with the computing device though ports that are controlled by dedicated circuitry or processing units. The operating system's support APIs can provide mechanisms by which the dedicated circuitry can be used by an extension in order for the extension to access and control the hardware device for which it was designed. For example, an operating system can provide support APIs that allow extensions access to specific areas of random access memory that are set aside for hardware input/output communications. Alternatively, an operating system can provide support APIs that allow extensions to access hardware input/output ports directly.

The extensions, on the other hand, can provide service APIs to allow the operating system or other software applications to access the functionality provided by the extension. For example, a device driver for a new display device can comprise code and data for controlling the display device. That code and data of the display device driver can be invoked by other code, such as operating system code or software application code in a predefined manner through the use of the service APIs. In the example of a display device driver, the service APIs can include APIs for requesting the display of image data, APIs for requesting information from the display, such as its current resolution, and APIs for requesting the activation of energy saving features of the display.

Unfortunately, because host software applications and extensions are generally authored by different individuals, it can be common that the extension does not interface properly with the host program. For example, some extensions, may not properly use the support APIs provided by the host software application, passing improper parameters, data or otherwise improperly requesting various functions. Other extensions may attempt to bypass the support APIs entirely and access functionality directly instead of through the host software application, such as disk access, screen access, and the like. Alternatively, extensions can also attempt to access support APIs that were not intended for use by extensions, such as APIs that are not fully documented or were intended only for internal use within the software application itself.

An extension that does not properly interface with its host software application can result in a failure of the overall host software application, or even the entire computing system. This can be especially problematic when the user of the host software application is forced to rely on multiple extensions from multiple parties simultaneously, such as the myriad of third-party device drivers commonly used by a modern operating system. Furthermore, such failures are often difficult to diagnose and properly support because, while the host software application may be blamed by the user, it is, in fact, the extension that is the cause of the instability. Therefore, it is desirable to create an extension environment that can provide access to the features and abilities of the extension to the host software application while insulating the host software application from instability that may be introduced by the extension.

BRIEF SUMMARY OF THE INVENTION

Embodiments of the invention allow extensions to be executed in a protected environment from which they can provide the intended benefits to the host software application while insulating the host application from instability caused by the extension.

In an embodiment, an extension can be executed in a virtual environment that can provide the support APIs that the extension may properly require while isolating the extension from the host software application.

In another embodiment, an extension can be executed in a virtual environment and a corresponding proxy extension can be executed in the process space of the host software application in such a manner that the proxy extension provides access to the abilities of the original extension while isolating the host software application from the original extension through the use of the virtual environment. The extension and the proxy can be similar, so as to provide fault isolation between a host software application and an extension designed to interface with the host software application, or the extension and the proxy can be different, so as to not only provide fault isolation, but to also extend the functionality of a host software application by enabling the host software application to utilize an extension that may not have been designed to interface with the host software application.

In a further embodiment, extensions that can require user mode context can be executed in a virtual environment by creating a surrogate host software application in the virtual environment, or by changing the page table mapping in the virtual environment so that the user mode range is mapped to the same physical memory in both the virtual environment and the host environment, or, as yet another alternative, the user mode context can be copied to the virtual environment. To maintain fault isolation, the physical memory of the host environment can be accessed in a read only manner, or by using copy-on-write techniques.

In a further embodiment, a virtual environment in which extensions can safely execute can be efficiently created by booting an original virtual environment having the functionality, or a superset of the functionality, required by the extension, and then, at a subsequent point in time when a virtual environment is required, cloning the state of the booted original virtual environment to create the required virtual environment.

In a still further embodiment, a virtual environment in which extensions can safely execute can be efficiently created during the initial startup sequence of a host environment by indicating to the host environment that a second processing unit is present in the computing system and then, after the host environment has completed the creation of a coherent state for the second processing unit, indicating to the host environment that the second processing unit has failed and subsequently indicating to the virtual environment that the second processing unit is present and starting up the virtual environment using the coherent state for the second processing unit created during the startup of the host environment.

In a still further embodiment, a virtual environment in which extensions designed to control hardware devices can safely execute can be efficiently created during the initial startup sequence of a host environment by indicating to the host environment that a second processing unit is present in the computing system, allowing the host environment to create a coherent state for the second processing unit, and allowing the host environment to bind the second processing unit to the hardware device which the extension is designed to control. After the host environment has completed the creation of a coherent state for the second processing unit, and the binding to the appropriate hardware device, the host environment can receive an indication that the second processing unit has failed while the virtual environment can be started up using the coherent state of the second processing unit created during the startup of the host environment, providing the virtual environment, and any extensions executing therein, simplified access to the hardware device bound to the second processing unit.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
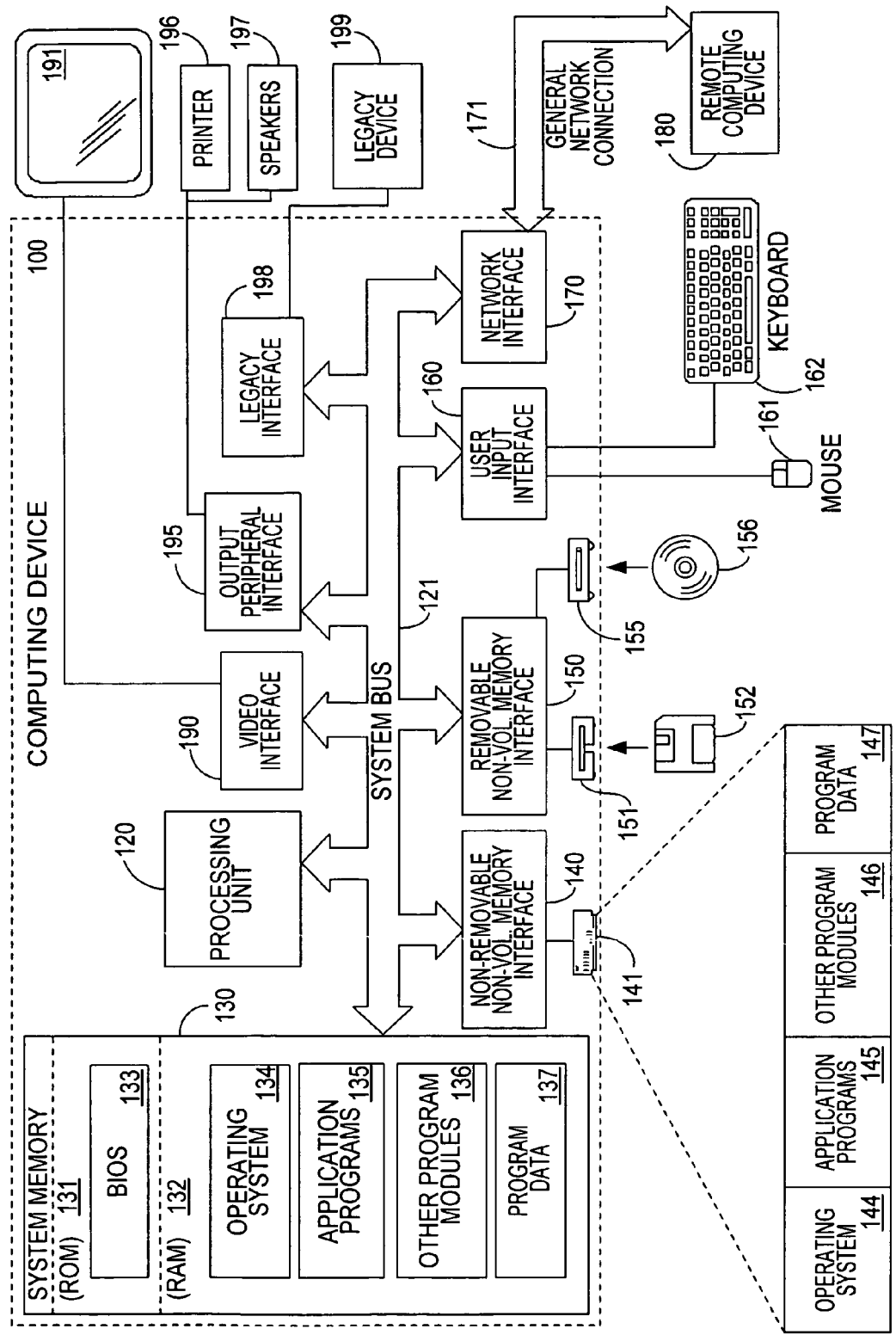
FIG. 1 is a block diagram generally illustrating an exemplary device architecture in which embodiments of the present invention may be implemented.

Many software applications and operating systems rely on extensions to provide additional functionality, services or abilities to end user. One often used extension is known as a device driver, and can provide an interface between a host software application, which is generally an operating system, and a hardware device. Other extensions include applets and plug-ins for web browser software applications, filters, effects and plug-ins for image editing software applications, and codecs for audio/video software applications.

Because extensions closely interoperate with their host software applications, instability introduced by an extension can render the entire host software application unusable. Generally, extensions provide access to their abilities through one or more application program interfaces (APIs) that can be used by the host software application. The APIs through which extensions expose their functionality are generally termed "service APIs". If the extension requires additional information, resources, or the like, the extension can request those from the host software application through one or more APIs generally termed "support APIs". Should either the extension or the host software application improperly use the service or support APIs, or attempt to access undocumented or unsupported APIs, any resulting errors or unintended artifacts can cause instability. Because extensions generally operate within the same process as their host software application, it can be very difficult for the host software application to continue operating properly when one or more extensions running within that process introduce instability.

If an extension could be executed in a separate process, such that any instability introduced by the extension can be isolated to a process that is independent from the host software application's process, the host software application can proceed to operate properly even in the face of unstable extensions. For software applications that may host many extensions, such as operating systems, isolating each extension can greatly improve the overall reliability of the operating system since the possibility of failure increases exponentially with each additional extension that is used. Furthermore, isolating extensions allows application authors to concentrate on identifying and eliminating sources of instability within their own algorithms. Consequently, embodiments of the present invention isolate extensions from their host software applications, while continuing to provide the benefits of the extensions to the host software applications.

Although not required, the invention will be described in the general context of computer-executable instructions, such as program modules, being executed by a computing device. Generally, program modules include routines, programs, objects, components, data structures, and the like that perform particular tasks or implement particular abstract data types. In distributed computing environments, tasks can be performed by remote processing devices that are linked through a communications network. In a distributed computing environment, program modules may be located on both local and remote computer storage devices and/or media. Those skilled in the art will appreciate that the invention may be practiced with many different computing devices, either individually or as part of a distributed computing environment, where such devices can include hand-held devices, multi-processor systems, microprocessor based or programmable consumer electronics, network PCs, minicomputers, mainframe computers, and the like.

Turning to FIG. 1, an exemplary computing device 100 on which the invention may be implemented is shown. The computing device 100 is only one example of a suitable computing device and is not intended to suggest any limitation as to the scope of use or functionality of the invention. Furthermore, the computing device 100 should not be interpreted as having any dependency or requirement relating to any one or combination of peripherals illustrated in FIG. 1.

Components of computer device 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus. Furthermore, the processing unit 120 can contain one or more physical processors.

Computing device 100 typically includes a variety of computer readable media. Computer readable media can be any available media that can be accessed by computing device 100 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computing device 100 may also include other removable/non-removable, volatile/nonvolatile computer storage media. By way of example only, FIG. 1 illustrates a hard disk drive 141 that reads from or writes to non-removable, non-volatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computing device 100. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computing device 100 through input devices such as a keyboard 162 and pointing device 161, commonly referred to as a mouse, trackball or touch pad. Other input devices (not shown) may include a microphone, joystick, game pad, satellite dish, scanner, or the like. These and other input devices can be connected to the processing unit 120 through a user input interface 160 that is coupled to the system bus, or may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

Because interface technology can improve over time, some computing devices can contain legacy interfaces to provide for backwards compatibility with legacy devices. The computing device 100 of FIG. 1 is shown with a legacy interface 198, which can be any of a number of interfaces including a serial port, a parallel port, a modem port or the like. The legacy interface 198 can enable the computing device 100 to communicate with legacy devices, such as legacy device 199, which can be a printer, scanner, oscilloscope, function generator, or any other type of input or output device. As will be known by those skilled in the art, most modern input or output devices interface though interfaces relying on newly developed standards, such as a USB port or an IEEE 1394 port. However, legacy devices are not likely to have such interfaces and must, therefore, rely upon a legacy interface in order to communicate with the computing device 100.

The computing device 100 can operate in a networked environment using logical connections to one or more remote computers. FIG. 1 illustrates a general network connection 171 to a remote computing device 180. The general network connection 171 can be any of various different types of networks and network connections, including a Local Area Network (LAN), a Wide-Area Network (WAN), a wireless network, networks conforming to the Ethernet protocol, the Token-Ring protocol, or other logical, physical, or wireless networks including the Internet or the World Wide Web.

When used in a networking environment, the computing device 100 is connected to the general network connection 171 through a network interface or adapter 170, which can be a wired or wireless network interface card, a modem, or similar networking device. In a networked environment, program modules depicted relative to the computing device 100, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains it at locations in the memory system of the computing device, which reconfigures or otherwise alters the operation of the computing device in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
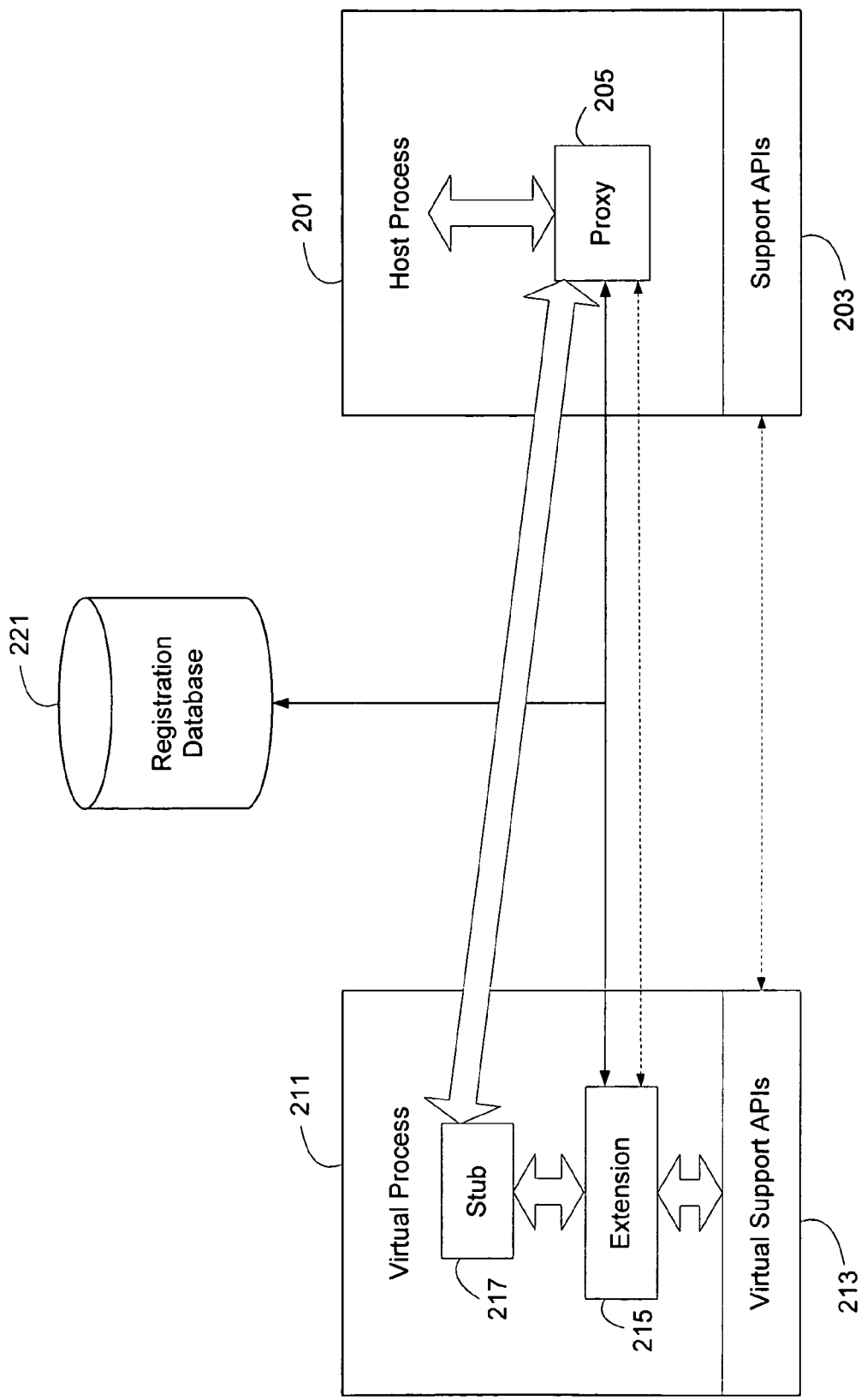
FIG. 2 is a block diagram generally illustrating an exemplary environment for isolating extensions according to embodiments of the present invention.

Turning to FIG. 2, one mechanism contemplated by an embodiment of the present invention for isolating an extension from a host software application is illustrated. As shown in FIG. 2, a host process 201 can invoke a proxy 205 instead of the extension 215 itself. The extension 215 can be hosted in a virtual process 211 that is distinct from the host process 201. The virtual process 211 can attempt to emulate the host process 201, at least to the extent that it can provide virtual support APIs 213 that are analogous to the support APIs 203 that the host software application may provide. The extension 215, running in the virtual process 211 can, therefore, use the virtual support APIs 213 in the same manner as it would use the original support APIs 203.

One design for the proxy 205 contemplated by an embodiment of the present invention can be to emulate the extension 215, at least to the extent that the proxy 205 can provide service APIs that are analogous to the service APIs provided by the extension 215. The host process 201 can then use the APIs provided by the proxy 205 to access the functionality of the extension in the same manner it would use the service APIs provided by the extension 215 itself. However, as shown in FIG. 2, when the proxy 205 receives a request from the host process 201, using such a service API, the proxy 205 can collect the relevant information from the host and forward that information to the extension 215 that is executing within the virtual process 211.

Another design for the proxy 205 contemplated by an embodiment of the present invention can be to interface with the host process 201 and translate, or intercept, certain functions of the host process and utilize the extension 215 to extend the functionality of the host process 201. For example, the extension 215 may provide access to a particular type of file storage, such as a file storage using an unusual or legacy file system format. In such a case, a proxy 205 can be designed to detect file access instructions within the host process 201 and intercept those instructions. The proxy 205 can then forward appropriate information to the extension 215, that can access files in the file storage using the legacy file system format. Information can then be returned to the proxy 205, from the extension 215, and the proxy 205 can present the information to the host process 201. In such a manner, the proxy 205 can extend the functionality of the host process 201, such as by enabling the host process 201 to access data saved in a legacy file system format, even if the host process was not designed to enable such extended functionality. Thus, the proxy 205 need not be based on a preexisting extension that was designed to interface with the host process 201, but rather can be designed to act as a shim between the host process and any extension.

Whether the proxy 205 is designed to emulate a preexisting extension, or to act as a shim for any extension, the proxy 205 can forward appropriate information to the extension 215 in order for the extension perform work for the host process 201. One method of forwarding information from the proxy 205 to the extension 215 contemplated by an embodiment of the present invention calls for the proxy 205 to communicate directly with the extension 215. In such a case, the proxy 205 itself can invoke the appropriate service API of the extension 215. An alternative method of forwarding the request contemplated by an embodiment of the present invention calls for the proxy 205 to communicate with a stub 217 executing within the virtual process 211. The stub 217 can then invoke the appropriate service API of the extension 215. As will be known by those skilled in the art, some extensions may not properly handle requests received via inter-process communication. To avoid such difficulties, a stub, such as stub 217, within the virtual process 211 can be used to provide a mechanism by which the extension 215 can receive requests through its service APIs via intra-process communication, rather than inter-process communication.

Once the extension 215 receives the request from the host process 201, it can proceed to respond to the request. Depending on the nature of the request, the extension 215 may access one or more functions that would normally be provided by the host process 201 through the support APIs 203, but can now be provided by the virtual process 211 through the virtual support APIs 213. As will be explained in more detail below, depending on the nature of the host's request, the extension 215 may need to access resources of the computing system 100 directly, or access hardware devices connected to the computing system in a direct manner. In such a case, provisions can be made to grant the extension 215 access to such resources while still isolating the extension 215 from the host process 201.

To achieve the intended isolation, it may not be sufficient to merely have two separate processes, such as the host process 201 and the virtual process 211. Therefore, embodiments of the present invention contemplate that the proxy 205 can be designed in such a manner so as to prevent incorrect responses from the extension 215, or improper behavior on the part of the extension, from affecting the host process 201. For example, in one mechanism contemplated by an embodiment of the present invention, the proxy 205 can be designed to rigorously adhere to the service APIs presented by extension 215. Therefore, if extension 215 attempts to return data to the host process 201 that is not of the form or type that the host is expecting, the proxy 205 can identify the potential problem and not pass that data to the host process.

In another mechanism contemplated by an embodiment of the present invention, the proxy 205 can apply further intelligence to the data being returned to avoid introducing instability into the host process 201. For example, if the extension 215 suffers a fatal error and fails, the proxy 205 can maintain a timeout counter, or similar mechanism, to detect the extension's failure and can inform the host process 201 of the error, such as by providing an error response or otherwise letting the host process degrade gracefully without, for example, losing a user's work product. The proxy 205 can also return any control that the host process 201 may have given to the extension 215, to prevent the failure of the extension from impeding the execution of the host process. For example, the proxy 205 can request that an underlying operating system terminate the virtual process 211 and return control to the host process 201. Alternatively, the proxy 205 can use dedicated code that is part of the virtual process 211 to inform the virtual process that a failure has apparently occurred, and request that the virtual process terminate and return control to the host process 201.

However, if the extension 215 completes whatever task had been requested of it properly, it can return any results that may be expected by the host process 201 in the manner specified by the service API. Thus, for example, if the result is an indication that the request succeeded, and is to be passed in a predefined variable back to the calling program, the extension 215 can pass this variable back to the stub 217 or directly to the proxy 205. From there, the variable can be returned it to the host process that originally made the call by the proxy 205. In such a manner the proxy 205 can become indistinguishable from the extension 215, at least as far as the host process 201 is concerned. Of course, as will be known by those skilled in the art, some extensions may not need to return any results, in which case no provision for accepting a returned value need be implemented.

As shown in FIG. 2, the extension 215 operates in the virtual process 211. Consequently, if an action of the extension 215 causes instability, the instability will likely be contained inside the virtual process 211. In such a case, the operating system or some other code, such as the proxy 205, can detect the error in virtual process 211 and can terminate it, or attempt to restart it. In either event, the instability will not likely affect the host process 201 and will not, therefore result in a detrimental failure to the user. Therefore, the mechanisms described above allow the host process 201 to continue to operate properly even if the extension 215 being used by the host process fails or otherwise becomes unstable.

As described in detail above, the proxy 205 can present service APIs to the host process 201 in the same manner as would the extension 215 if it was running in the host process. In one mechanism contemplated by an embodiment of the present invention, the proxy 205 can be created based on the predefined service APIs implemented by the extension 215. As will be known by those skilled in the art, the service APIs though which an extension and a host software application can interoperate are generally known in advance because the software application author and the extension author are often different entities. When an extension is installed, it can register itself with the host software application, or an appropriate information store, such as the registration database 221, and indicate which service APIs it supports. Using this information, the host software application, or the underlying operating system, can locate the appropriate extension when the host software application attempts to use one of the service APIs. This information can also be used to create the proxy 205, since it indicates the complete set of service APIs supported by the extension 215. The creation of proxy 205 can also change the entries in, for example, the registration database 221, in a manner to be described in further in detail below.

Another mechanism contemplated by an embodiment of the present invention is the creation of a "super proxy" that can accept requests based on the entire set of predefined service APIs. Such a super proxy can then be invoked irrespective of which particular service API the host application seeks to use. In such a case, any registration that the extension 215 may perform at install time can include a registration with the super proxy, or underlying support architecture, so that the super proxy can invoke the proper extension 215 when a particular service API used by the host software application.

A further mechanism contemplated by an embodiment of the present invention is that the proxy 205 can be created based on the extended functionality the proxy seeks to provide to the host process 201. Thus, the proxy 205 can be created to detect, intercept, or otherwise interface with one or more functions used by or within the host process 201 so that the proxy can provide the benefits of the functionality of the extension 215 to the host process. Using the above described example, if the proxy 205 is designed to allow the host process 201 to access a legacy file system through extension 215, the proxy can be designed to detect and intercept file access and similar functions used by the host process. The proxy 205 can be further designed to forward relevant information from those file access functions to the extension 215 so that the extension can interface with the legacy file system. Similarly, the proxy 205 can be designed to accept responses form the extension 215 and convert them into a format that would be recognized by the host process 201 as an appropriate response associated with the intercepted file access functions of the host process.

In some cases, it may be desirable to modify the virtual support APIs 213 to more accurately reflect the support APIs 203. For example, the virtual support APIs 213 may, if queried for an identifier of the process, return the identifier of the virtual process 211. It may, however, be desirable for the virtual support APIs 213 to return the identifier of the host process 201. In such a case, "back channel" or "side channel" communication can be used to enable the virtual support APIs 213 to access information from the host process 201.

To ensure that the proper proxy is invoked for the particular extension requested, a registration database, or similar information store, can be used to link the proxy 205 to the extension 215. As described above, the registration database 221, or similar information store, can be consulted by the host process 201, or the operating system, to determine the parameters for invoking the extension 215. However, rather than identifying the extension 215 itself, the registration database 221 can instead point to the proxy 205.

Once the host process 201 has invoked proxy 205, the proxy 205 can proceed to invoke or otherwise coordinate the invocation of the extension 215 within virtual process 211. As will be described in detail below, the virtual process 211 may already be operational or it may be in various states of readiness. If the virtual process 211 is not already operational, the proxy 205 can coordinate the completion of whatever steps may be necessary for the virtual process 211 to reach an operational state. Once the virtual process 211 is operational, the proxy 205 can instruct the virtual process 211 to invoke extension 215. For example, the proxy 205 can provide a pointer to the location of the extension 215 and can pass along the same or similar parameters used by the host process 201. In addition, if it was determined that the extension 215 uses back channel or side channel communication, any additional resources used by the extension can also be invoked within virtual process 211.

Once the virtual process 211 has invoked the extension 215, and any other code used by the extension, the proxy 205 can coordinate the invocation of a stub 217, if necessary. Alternatively, the proxy 205 can establish communication links with the extension 215 directly. If a stub 217 will be used, the proxy 205 can provide the virtual process 211 with the location of the stub 217 and the parameters to be used in invoking the stub. Once the stub 217 is invoked, the stub itself can establish communication links with the extension 215, as well as establishing communication links with the proxy 205. Communication between the proxy 205 and the stub 217 or the extension 215 can use any type of inter-process or intra-process communication protocols, including, for example, known Remote Procedure Call (RPC) mechanisms. While it is likely that the communication protocols used will be decided in advance, a handshaking procedure can be implemented to ensure that the proxy 205 and the stub 217 or the extension 215 can communicate appropriately.

Because some extensions may rely on a user mode context to perform the functions requested of them by the host process, it may be necessary to provide mechanisms by which an extension in a virtual environment can be provided a user mode context. A user mode context can generally refer to the overall state of a process's resources, including memory, files, registry entries, and the like such that particular resource references within a given user mode context are accurate, while those same references, when passed outside of the particular user mode context, can refer to improper memory locations, or are otherwise inaccurate. For extensions that may accept or return large amounts of data, it is often more efficient to send and receive memory references assuming a common user mode context, than it is to send and receive the data itself. Therefore, maintaining a common user mode context between the virtual process 211 and the host process 201 may be required if an extension using such data passing schemes is to operate properly.

Figure 3:
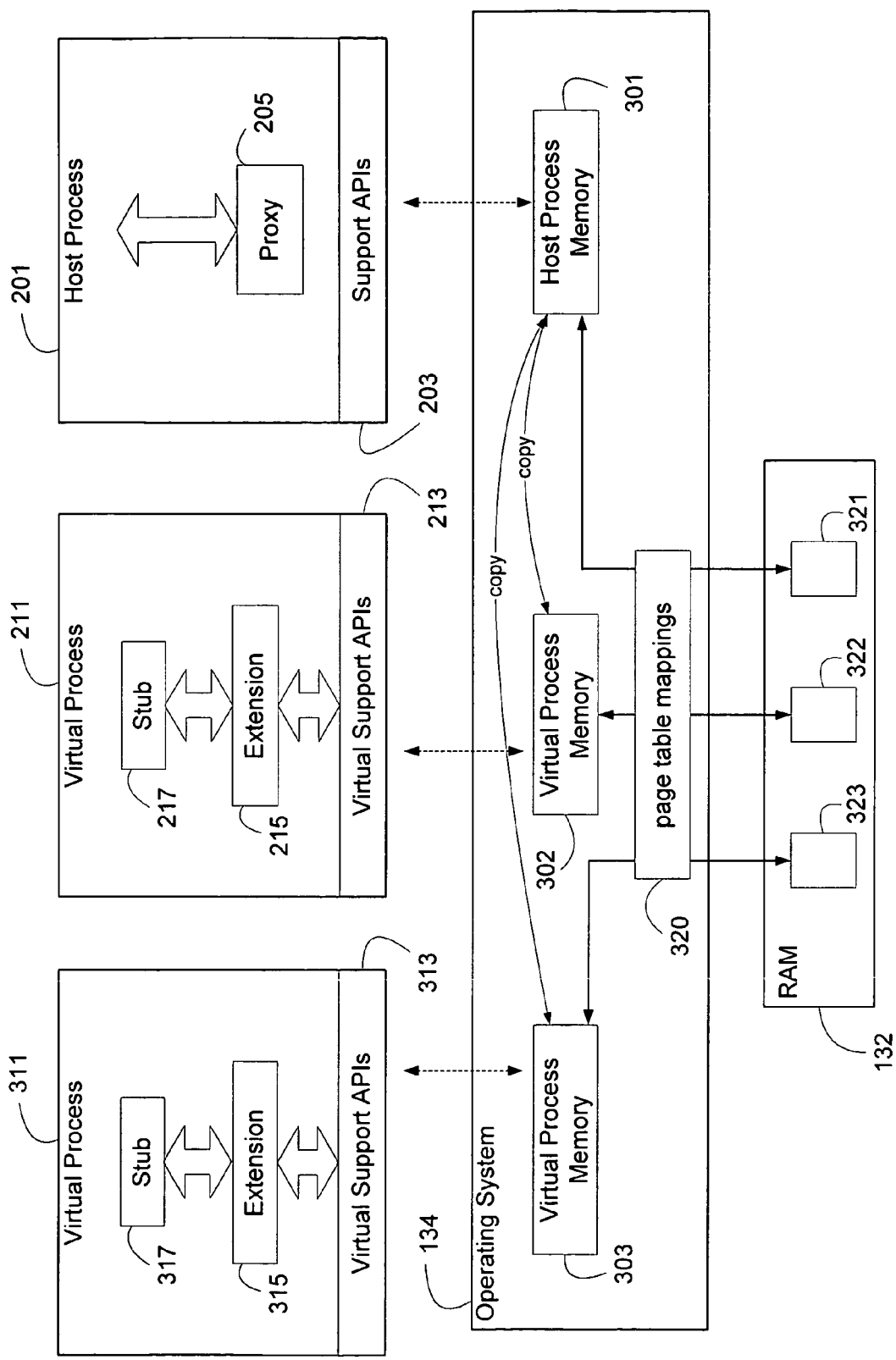
FIG. 3 is a block diagram generally illustrating access to a user mode context according to an embodiment of the present invention.

Turning to FIG. 3, the host process 201 is shown having invoked, in the manner described in detail above, two extensions executing inside of virtual processes 211 and 311, namely extension 215 and extension 315, respectively. The proxy 205 can be a super proxy, as described in detail above, and can direct requests from the host process 201 to either the extension 215 or the extension 315. Alternatively, a second proxy, not shown in FIG. 3, can be used such that each of the extensions 215 and 315 can have a one-to-one relationship with a proxy within the host process 201.

The operating system 134 is also shown in FIG. 3, comprising the host process memory 301 and the virtual process memories 302 and 303, which correspond to the host process 201, virtual process 211, and virtual process 311, respectively. While the mechanisms illustrated in FIGS. 3 and 4 can rely on a common operating system underlying the host process 201 and the virtual processes 211 and 311, additional mechanisms, which will be described in greater detail below, can also provide a common user mode between the host process and the virtual processes, even if the virtual processes are being executed independently of the operating system 134 underlying the host process. Where the host process 201 and the virtual processes 211 and 311 do share a common operating system 134, as illustrated in FIG. 3, the operating system can also comprise a collection of page table mappings 320 that map the host process memory 301 and virtual process memories 302 and 303 to segments of physical RAM 132. While FIG. 3 shows segments 321, 322 and 323 as corresponding to host process memory 301 and virtual process memories 302 and 303, respectively, it will be understood by those skilled in the art that segments 321, 322 and 323 are illustrative only and it is likely that the physical segments of RAM would be scattered, and would not be contiguous in the manner illustrated.

To maintain a common user mode context between the host process 201 and the virtual processes 211 and 311, the operating system 134, or other support software, can provide access to some or all of the resources that comprise the user mode context of host process 201 to virtual processes 211 and 311. While the following description focuses on mechanisms for providing common access to the memory resource aspects of a user mode context, those of skill in the art will recognize the applicability of these mechanisms to other resources that can comprise a user mode context, including registry resources, file resources, and the like.

In one mechanism for providing common access to memory resource aspects of a user mode context contemplated by an embodiment of the present invention, the operating system 134, or similar support software, can copy the host process memory 301 to the virtual process memories 302 and 303. As illustrated in FIG. 3, the copy of the host process memory 301 to the virtual process memories 302 and 303 can entail a physical copy of RAM segment 321 to new RAM segments 322 and 323. Alternatively, the I/O manager can copy the host process memory 301 into a resident nonpaged pool of system memory and can provide the virtual process 211 or 311 access to that nonpaged pool.

Once the extension 215 or 315 has completed its task, the virtual process memory 302 or 303 can be merged back with the host process memory 301. For example, the proxy 205 can perform a difference function, which can be a byte-for-byte compare, or a more macro level comparison, between the virtual process memory in locations 322 and 323 and the host process memory in location 321 to determine any differences. Those differences can be verified as proper and otherwise conforming to the expected behavior of the extensions 215 or 315 and can then be copied back to the host process memory 301, or otherwise made available to the host process 201 through the proxy 205. Alternatively, if the I/O manager had only copied the host process memory 301 into a resident nonpaged pool of system memory, the I/O manager can copy the nonpaged pool back to the host process memory. Generally, such copies would be done on a per-request basis. Therefore, rather than copying the entire host process memory 301, a more efficient mechanism contemplated by an embodiment of the present invention calls for the operating system 134, or other support software, to copy only those buffers of the host process memory 301 needed by the extension 215 or 315 to perform the requested task. When performed by the I/O manager of the operating system 134, such buffer-specific copies to the nonpaged pool of system memory are known as "Buffered I/O" or "I/O Method Buffered".

Figure 4:
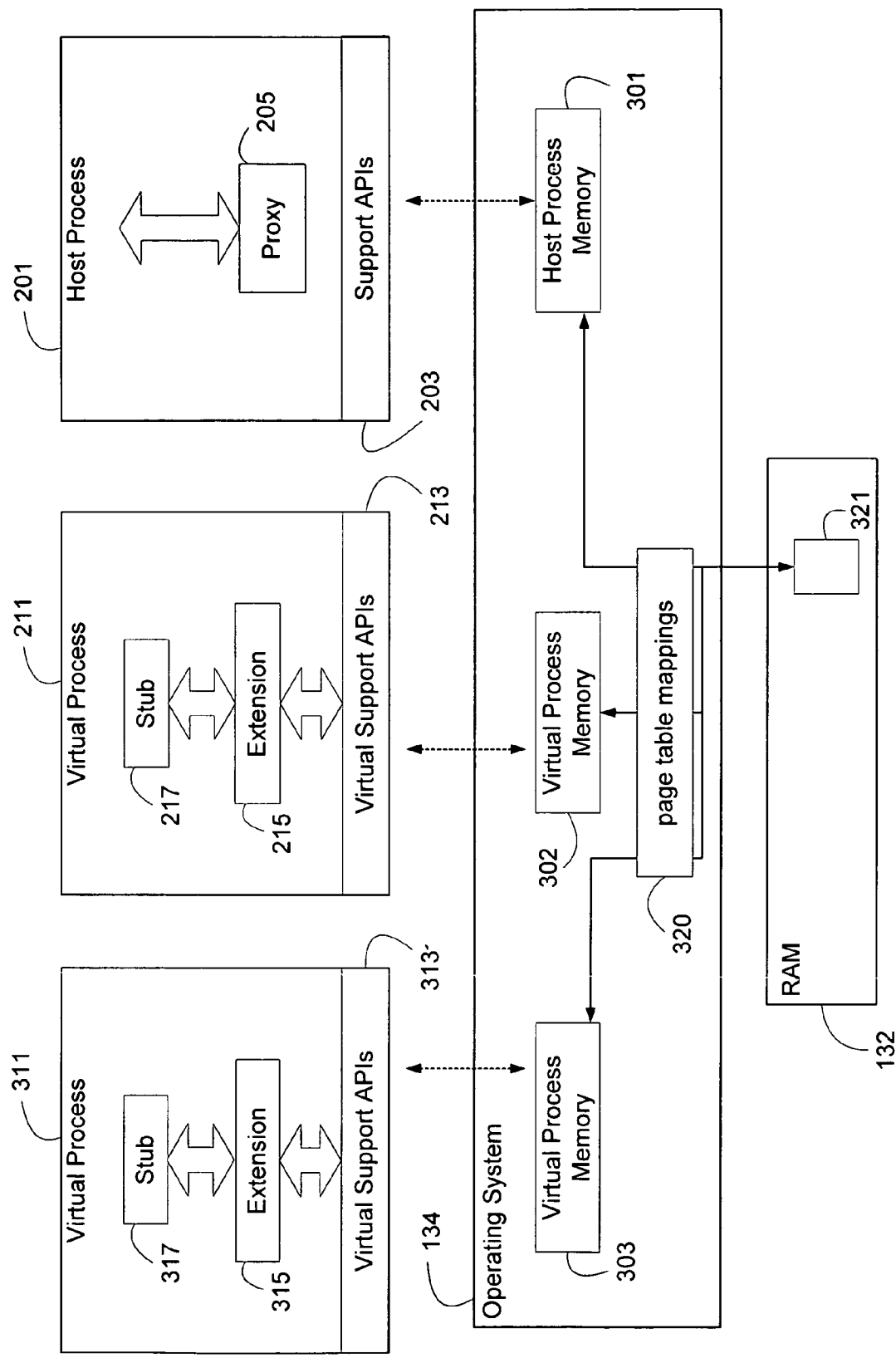
FIG. 4 is a block diagram generally illustrating alternative access to a user mode context according to an embodiment of the present invention.

Turning to FIG. 4, an alternative mechanism for providing common access to memory resource aspects of a user mode context contemplated by an embodiment of the present invention is shown. Specifically, as shown in FIG. 4, rather than copying some or all of the host memory process 301, the page table mappings 320 maintained by the operating system 134 can be modified to direct the virtual process memory 302 and 303 to the physical location 321 in RAM 132 in which the data that represents the host process memory 301 is stored. Because the need to copy data is eliminated, the mechanism illustrate in FIG. 4 can be more efficient than the mechanism illustrated in FIG. 3.

However, if the extensions 215 and 315 can affect the physical segments 321 that comprise the host process memory 301, an error or instability on the part of the extensions can result in errors or instability in the host process 201 itself. Therefore, to minimize this possibility, the page table mappings can be modified in a "read-only" manner so that the virtual processes 211 and 311 can be pointed to the physical memory 321 to read it but will not be allowed to modify it. Any error or instability on the part of the extensions running in virtual processes 211 and 311 cannot, therefore, introduce errors or instability into the host process 201 because the virtual processes would not be allowed to modify the host process' memory.

As indicated above, the modification to the page table mappings 320 contemplated by the mechanism of FIG. 4 can be done on a per-request basis. However, if only one virtual process exists, the page table mappings 320 can continue to point to physical segment 321 of RAM 132 even for requests that do not require a user mode context. The modification of page table mappings described above is generally known as "Neither Buffered Nor Direct I/O" or "I/O Method Neither".

A further alternative mechanism for providing common access to memory aspects of a user mode context contemplated by an embodiment of the present invention can be a hybrid of the alternatives illustrated in FIG. 3 and FIG. 4. Specifically, the virtual processes 211 and 311 can be provided read-only access to the physical memory 321, as described in detail above. However, if either the extension 215 or the extension 315 needs to write data back to memory, a "copy-on-write" can be performed. As will be known by those skilled in the art, a copy-on-write can copy the data being modified to a new location prior to writing the modification to the data. Thus, if the extension 215 or the extension 315 needed to write data back to memory 321, some or all of the memory 321 can be copied to a new location, such as 322 or 323, as shown in FIG. 3, and the extension 215 or the extension 315 can then modify the copied data in memory 322 or 323. In such a manner, any error or instability introduced by the extensions running in virtual processes 211 and 311 would not affect the host process 201 because the virtual processes would not be allowed to modify the host process' memory The proxy 205 can track those segments of memory that may have been edited by the extension 215 or the extension 315 using the above described copy-on-write mechanisms. When accessing those memory segments, the proxy can appropriately reference the locations 322 or 323, instead of the location 321. If the data stored in the locations 322 or 323 conforms to the expected behavior of the extensions 215 or 315, the proxy 205 can allow the data to be used within the host process 201, such as by copying it into to the host process memory 301, or by passing locations 322 or 323 to the host process. The above described isolation can, therefore, be accomplished while allowing the proxy 205 to access the modified data.

As explained above, the initialization of a virtual process that can host an extension, such as the virtual process 211 of FIG. 2, can be coordinated by the proxy 205 after the proxy is invoked by the host process 201 in place of the extension 215. One type of virtual process contemplated by an embodiment of the present invention is a copy of the host process 201 executing on the same operating system 134 as the host process. Such a virtual process can be created by forking the host process and using the cloned process as a virtual process. Alternatively, the operating system could be instructed to again launch whichever software application was initially invoked to create the host process 201. Thus, for example, if the host process 201 was a web browser, the virtual process 211 could be created by launching the web browser application again to create a separate process or by forking the currently running web browser process.

Another type of virtual process contemplated by an embodiment of the present invention can be created within the context of a virtual machine environment. A virtual machine can offer an optimal solution should the extension 215 be a device driver or other extension used by an operating system. While it may be possible to use an operating system to create another copy of itself to act as a virtual process, such as by forking or reexecution, a more elegant solution can be to launch a virtual machine and boot an operating system in the virtual machine's environment to act as a virtual process for hosting one or more extensions. Such a mechanism is likely to provide for better isolation and can allow one operating system to use extensions designed for a different operating system. For example, a legacy driver that may not have been updated for a newer version of an operating system can be hosted within an older version of the operating system running within a virtual machine environment. In such a manner, the features and abilities of the extension can still be made available to a user of a newer operating system, while shielding the newer operating system from any instability that may be caused by the legacy extension. By using a virtual machine, or by performing the above described forking or re-execution, the virtual process 211 can provide equivalent support APIs as the host process 201 without the need to account for support functions on an individual basis.

Unlike virtual processes 211 and 311, which receive support from an underlying operating system 134, a virtual machine, as will be known by those skilled in the art, generally does not make use of an operating system in this manner. Instead, to avoid the performance penalty of having each virtual machine instruction passed through a full operating system, a virtual machine can instead only rely on a hypervisor that can provide limited operating system functionality and can abstract the underlying hardware of the computing device for whichever operating system will be run in the virtual machine environment. By using such a hypervisor, a virtual machine can operate much more efficiently. However, as a consequence of using a hypervisor, before the virtual machine process can be executed on a processor of a computing device, the operating system of that computing device can be removed and the underpinnings of that operating system can be stored. Subsequently, when the virtual machine process has completed a task, it can remove its underpinnings from the hardware, and the original operating system can be restored. Such an exchange of hardware usage, between the operating system of a computing device, and a virtual machine process, can occur many times each second. Thus, while the user may perceive the virtual machine as simply another application that uses the operating system, the virtual machine process generally only timeshares the computing device hardware with the operating system.

To accomplish the above describe exchange, a virtual machine can comprise a virtual machine device driver or similar extension that can be invoked by the operating system of the computing device. The virtual machine device driver can provide the necessary instructions for removing the underpinnings of the operating system from the computing device hardware and caching them until such time that the operating system is allowed to resume execution. In addition, the virtual machine device driver can coordinate the invocation of the virtual machine process. For example, the operating system can, while it is executing, receive a user command to have the virtual machine process perform a task. The operating system can then issue a command to the virtual machine device driver to have the virtual machine process perform the requested task and return control to the operating system in an efficient manner. Thus, the operating system can treat passing control to the virtual machine process as it would passing control to any other thread currently being coordinated by the operating system. The virtual machine device driver can, upon receiving such a command, remove the underpinnings of the operating system from the computing device hardware, allow the hypervisor to install its underpinnings, and pass the command to the virtual machine process. Subsequently, when the virtual machine process has completed, the virtual machine device driver can reinstall the operating system's underpinnings and allow it to resume execution on the computing device hardware.

As described in detail above, the proxy 205 can detect a failure within the virtual process 211, and can seek to prevent that failure from introducing instability into the host process 201. However, if the virtual process 211 is a virtual operating system process running in an environment created by a virtual machine, it may be difficult for the proxy 205 to detect or control such a virtual operating system process, since the operating system on which the proxy 205 can rely is not executing on the computing device hardware, but is instead stored and waiting for the virtual machine to complete its execution. Consequently, one mechanism for isolating errors contemplated by an embodiment of the present invention calls for the hypervisor to monitor software executing in the environment created by the virtual machine and detect failures within that environment. If a failure is detected, the hypervisor can stop execution, reinstall the operating system's underpinnings, and allow it to resume execution on the computing device hardware. The hypervisor can also provide an appropriate response to allow the operating system, or other software that was relying on the extension in the virtual environment, to degrade gracefully.

In addition, because the operating system generally cannot resume execution until it is allowed to do so by the hypervisor, the hypervisor can also maintain a timer or similar mechanism to ensure that a failure in the virtual machine environment does not prevent control from ever returning to the operating system. While a timer mechanism can be used to detect a failure, in the manner described above, the timer mechanism can have further importance if a virtual machine is used to create an environment in which to host one or more extensions because there may not exist any other mechanisms by which control can be returned to the operating system if a failure occurs in the virtual machine environment.

Alternatively, rather than maintaining a mechanism by which failures can be detected, such as a timer mechanism, in the hypervisor, such a mechanism can be maintained in the hardware of the computing device 100, which can prompt the hypervisor to return control to the operating system if a failure is detected in the environment created by the virtual machine. For example, the operating system can set a timer in hardware prior to allowing the hypervisor to execute on the hardware. Subsequently, if a failure occurs within the environment created by the virtual machine, the hardware-maintained timer can expire and prompt the hypervisor to return control to the operating system. To return control to the operating system, the hypervisor can be modified to abort any execution if the hardware-maintained timer expires, and return control to the operating system. The hypervisor can also indicate the presence of an error, or can indicate that an execution was not completed if control is returned in this manner.

An additional complication, if the virtual process 211 is a virtual operating system process running in an environment created by a virtual machine, is that communication between the proxy 205 and the virtual process 211, or extension 215, may not be able to rely on inter-process communication or RPC mechanisms, as described in detail above. Instead, communication between the proxy 205 and the virtual operating system process 211 can be coordinated by the hypervisor or other mechanisms set up by the virtual machine for communicating with the operating system process underlying the host process 201. Such mechanisms can include, for example, storing messages in predefined memory locations in order to be accessible to both the virtual machine and the operating system when each is executing on the computing device hardware or, as another example, providing communication threads that remain in memory while both the virtual machine and the operating system are executing on the computing device hardware.

In addition, the mechanisms described in detail above, which can provide a common user mode between the virtual process 211 or 311 and the host process 201, may also require some modification to be implemented in an environment in which the virtual process 211 or 311 is a virtual operating system process running within a virtual machine environment. For example, rather than relying on a common operating system 134 to perform the modifications to the page table mappings, the modifications can be made in the page table mappings maintained by hypervisor of the virtual machine. Thus, if the host process memory 301 is copied to create virtual process memory 302 and 303, such a copy can be performed by the hypervisor rather than the operating system 134 shown in FIG. 3. More specifically, the host process memory 301 can remain in the physical memory location 321 even after the host operating system is no longer executing and the virtual machine process is executing. The hypervisor can identify physical memory location 321, and can copy the contents of that location into a physical memory location 322 or 323 which can be under the control of the hypervisor.

In a similar manner, if the common user mode between the host process 201 and the virtual processes 211 and 311 is achieved by modifying the page table mappings, in the manner described in detail above with reference to FIG. 4, the modification of the page table mappings can be performed by the hypervisor. Thus, the host process memory 301 can remain in the physical memory location 321 and the hypervisor can map virtual process memory 302 and 303 to the physical memory location 321 even if the host operating system is not currently executing. Significantly, both the virtual process memory that would need to be mapped to the physical location 321, such as virtual process memory 302 or 303, would be under the control of the hypervisor. Consequently, because the host process memory 301 would not require any modifications, the above described mechanism would not require any support from the operating system 134, which can, therefore, be any standard operating system.

If the virtual process memory is mapped to the physical memory locations used by the host process memory and a copy-on-write scheme, such as that described in detail above, is to be used, the hypervisor can also perform the necessary copying. For example, the hypervisor can set aside an additional physical memory location in which to store values written as part of the copy-on-write. Furthermore, as described above, the proxy 205 can be modified to reference both the host process memory 301 and the additional locations used for the copy-on-write. However, because the additional memory set aside by the hypervisor may not be memory that can be used by the operating system underlying the proxy 205, the proxy can be modified to specifically reference the memory locations even if they are not properly accessed by the underlying operating system. Alternatively, the memory locations set aside by the hypervisor can be further copied to memory locations accessible to the operating system underlying the proxy 205 as part of the procedure by which the virtual machine stops executing on the computing device and the operating system is allowed to resume execution.

A further alternative mechanism for providing a common user mode context contemplated by an embodiment of the present invention calls for a surrogate host process to be run inside the virtual operating system process. For example, a surrogate host process, analogous to the host process, can be run on top of the virtual operating system in the virtual machine environment. The user mode context of the surrogate host process can be identical to the user mode context of the host process that is outside of the virtual machine environment, thereby automatically providing for a common user mode. The common user mode can be maintained by communication between the host process and the surrogate host process, such as by using the techniques described above, without the need to explicitly access or copy the host process memory 301.

One mechanism contemplated by an embodiment of the present invention for creating a virtual operating system process, is the invocation of a virtual machine software application on the host computing device 100, followed by the booting of an appropriate operating system within the context of the environment created when the virtual machine software application is executed. As will be known by those skilled in the art, a virtual machine software application generally comprises an operating system extension that can be used to remove the underpinnings of the operating system 134 from the computing device hardware and store them into temporary storage. A virtual machine software application can also comprise a hypervisor that can, after the underpinnings of operating system 134 are removed, install its own underpinnings on the computing device hardware and abstract that hardware in an appropriate manner to create a virtual environment. An virtual operating system, which can be the same or different than the operating system 134, can then be booted on the abstracted hardware provided by the hypervisor. Thus, the hypervisor can create a virtual machine environment in which a virtual operating system process can execute independently of the operating system 134. While such a virtual operating system process can provide the above enumerated benefits, the invocation of a virtual machine software application, including the described removal of the operating system 134, and the booting of an appropriate operating system within the virtual machine environment, can be a prohibitively slow process.

To avoid the inefficiency introduced by launching a virtual machine software application and then booting an operating system within the virtual machine environment, another mechanism contemplated by an embodiment of the present invention calls for a virtual machine to be initialized and an operating system to be booted within the virtual machine environment and the resulting final state of the virtual machine environment to be saved and cloned for further use. Thus, for example, during an initial startup of the computing device 100, after the operating system 134 has been booted, a virtual machine software application can be automatically started and an virtual operating system can be booted within the environment created by the virtual machine. Once this virtual operating system has been booted, the state of the virtual machine environment can be saved. As will be known by those skilled in the art, such a state can be easily saved because the virtual machine software application likely creates only a handful of files on the storage media of computing device 100 that comprise the state of the virtual machine environment. Those files can be accessed and copied and the virtual machine software application can then be left in an operational state, or alternatively it can be placed in a reserve state, such as a sleep mode, or it can even be shut down entirely.

Subsequently, when a host process, which can be the operating system 134 or any of the software applications 145, attempts to perform an operation that would result in the use of an extension, either by design, or because a proxy may have interceded, the saved state of the virtual machine environment can be copied and a new virtual machine environment can be created in an efficient manner. Because the state of the virtual machine's environment already comprises a booted virtual operating system, a virtual process that can host the requested extension can be easily created. For example, if the requested extension is an operating system extension, a virtual process for the extension, already exists in the form of the virtual operating system. If, on the other hand, the requested extension is a software application extension, then the appropriate software application can be executed on the virtual operating system and can, thereby, create an appropriate virtual process. Consequently, by saving the state created by a virtual machine software application after a virtual operating system has been booted within the virtual machine's environment, and then cloning that saved state as necessary, a virtual process for hosting both operating system and software application extensions can be efficiently created.

To provide appropriate support for the creation of a virtual process, the virtual machine software application can be designed to abstract a superset of hardware that can be larger than such a virtual machine software application would normally abstract. Similarly, the virtual operating system that is booted within the virtual machine environment can implement a complete operating system API set. By abstracting such a superset of hardware, and providing a complete operating system API set, there is a greater likelihood that the state created by the virtual machine can be used to generate an appropriate virtual process for a requested extension. Consequently, a greater number of useful virtual processes can be generated by cloning the saved state, and fewer virtual process will need to be created using more costly mechanisms.

Figure 5:
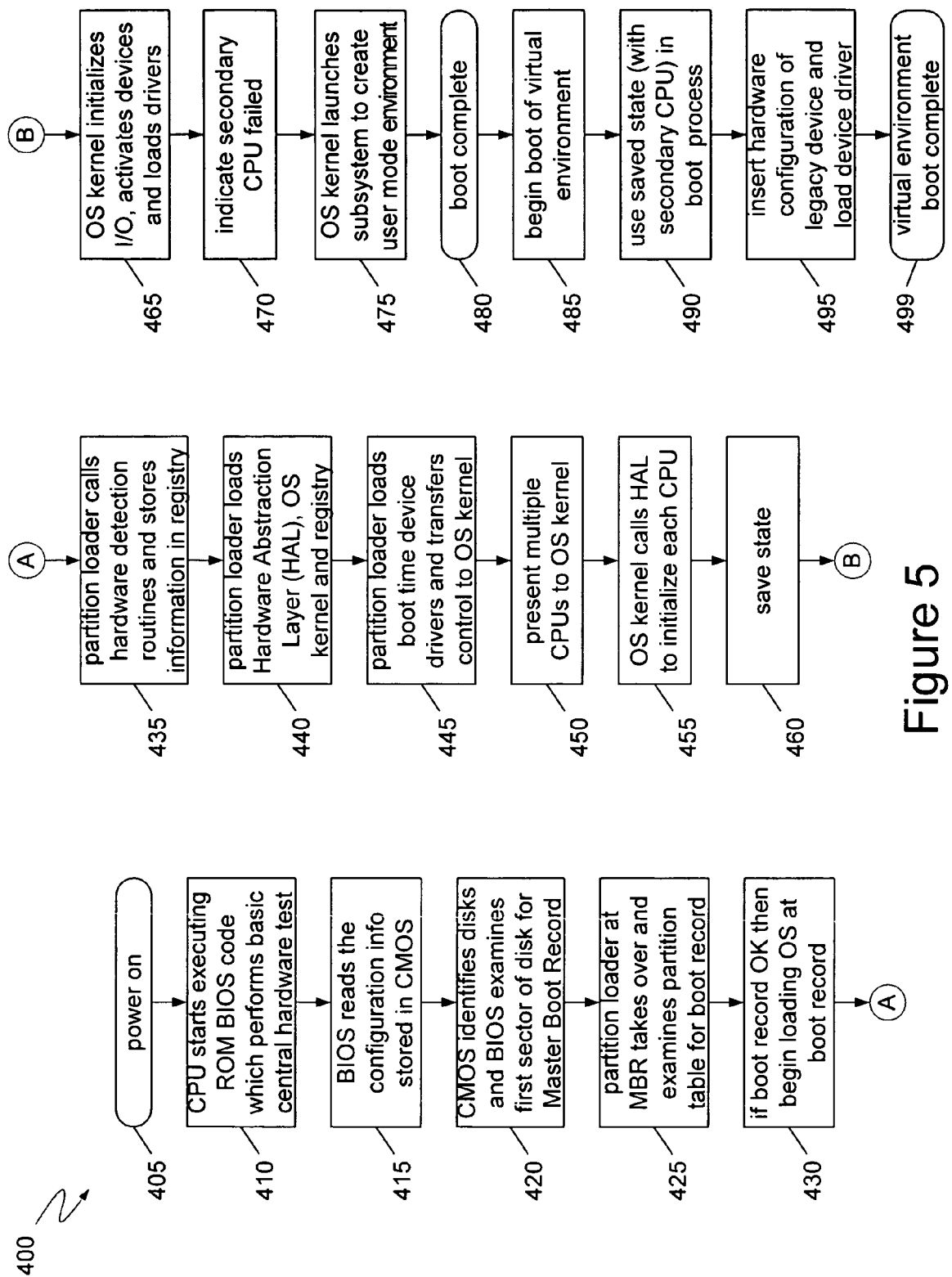
FIG. 5 is a flow diagram generally illustrating the creation of a coherent state according to an embodiment of the present invention.

Turning to FIG. 5, another mechanism for creating a virtual operating system process contemplated by an embodiment of the present invention is shown. The flow diagram 400 generally illustrates the startup procedures of many modern computing devices, such as computing device 100. The flow diagram 400 is not intended to be a detailed description of the startup process of a particular computing device or operating system, but is instead intended to provide a general illustration of elements commonly found in startup procedures, so as to better explain mechanisms contemplated by an embodiment of the present invention.

As can be seen from FIG. 5, a startup procedure is initiated by providing power to the computing device at step 405. At a subsequent step 410, a Central Processing Unit (CPU) can begin executing instructions found in the Read Only Memory (ROM) Basic Input/Output System (BIOS). The ROM BIOS can perform basic hardware tests to ensure that the central hardware elements of a computing device are functioning properly. At step 415, the BIOS can read configuration information, which is generally stored in Complementary Metal-Oxide Semiconductor (CMOS) memory. As will be known by those skilled in the art, the CMOS memory can be a small area of memory whose contents are maintained by a battery when the computing device is not operational. The CMOS memory can identify one or more computer readable media that can be connected to the computing device. As indicated by step 420, the BIOS can examine the first sector of various computer readable media in an effort to find a Master Boot Record (MBR).

Generally, the MBR contains some or all of a partition loader, which can be computer executable instructions for locating a boot record and beginning the boot of an operating system. Thus, at step 425 the partition loader found at the MBR can take over from the BIOS and can examine a partition table, or similar record, on the computer readable medium to determine an appropriate operating system to load. Each operating system can have a boot record associated with it, and, at step 430, if the boot record does not have any problems, the partition loader can initiate the booting of the operating system.

As part of the booting of the operating system, the partition loader can invoke hardware detection routines that can begin to perform hardware detection, as indicated by step 435. Generally, the hardware detection performed at step 435 is only preliminary and, rather than necessarily enabling the hardware, the hardware detection of step 435 may only create a list of hardware devices for later use. Such a list can, for example, be stored in a registration database or similar information store. At step 440, the partition loader can invoke another operating system process or subsystem to provide a communication and control link to the various hardware devices of the computing device. Sometimes this subsystem is known as the "Hardware Abstraction Layer" (HAL). In addition, the partition loader can also, at step 440, load the operating system's kernel and the registry, or similar database containing the necessary hardware and software information.

The registry, or similar database loaded by the partition loader at step 440, can also contain a list of device drivers that may be needed for the operating system kernel to access required hardware, such as the hard drive or the memory. At step 445, therefore, the partition loader can load these device drivers in order to provide the appropriate support for the operating system kernel. Once the device drivers are loaded, the partition loader can, also at step 445, transfer control of the computing device to the operating system kernel.

While the steps 405 through 445 of flow diagram 400 have generally illustrated elements of most startup routines, step 450 illustrates the first part of a mechanism contemplated by an embodiment of the present invention for creating a virtual operating system process that can host operating system extensions, or software applications. Specifically, at step 450, the HAL or information associated with the boot record can indicate, to the operating system kernel, that more CPUs are present in the computing device than are, in fact, physically present. Thus, for example, in a computing device with only a single CPU, the operating system kernel can receive, at step 445, an indication of two or more CPUs present in the computing device. Similarly, for a computing device that already has two CPUs, the operating system kernel can receive an indication of three or more CPUs present in the computing device. As will be described in detail below, by indicating the presence of CPUs that are not, in fact, present, a virtual operating system process can be created more easily and efficiently.

Returning to the flow diagram 400, at step 455 the operating system kernel can call the HAL to initialize each CPU that the operating system kernel believes is present in the computing device. The request to initialize CPU can, therefore, include CPUs that are not, in fact, present in the computing device. Once the HAL has completed initializing all of the CPUs, the state of the system can be saved, at step 460, for subsequent use in efficiently creating a virtual operating system process, in a manner to be described in detail below. The booting of the operating system can then continue with standard startup operations, including, for example, initializing various subsystems of the operating system, activating hardware devices that comprise the computing device 100, and loading the appropriate device drivers, as indicated by step 465. While step 465 specifically lists the initialization of an input/output (I/O) subsystem, the operating system kernel can also initialize memory managers, process managers, object managers, various kernels of the operating system, and similar subsystems at step 465. In addition, the operating system kernel can reenable hardware interrupts and can activate the various hardware devices detected as part of the computing device 100. As indicated above, as part of the activation of various hardware devices the operating system kernel can also load the appropriate device drivers for those devices. As will be known by those skilled in the art, because many operating systems were originally designed for a computing device with a single CPU, such operating systems generally perform the majority of the steps illustrated in FIG. 5 with only a single CPU, and only activate any additional CPUs after nearly completing all of the startup procedures. Consequently, the primary CPU generally maintains all of the hardware bindings, while the other CPUs can be tasked with various processes that will be executing on the computing device.

As described above, at step 450, the operating system kernel was informed of additional CPUs even though the CPUs may not have been physically present in the computing device. Thus, at step 470, the operating system kernel can be informed that those CPUs that were indicated at step 450, but are not physically present, have failed. This indication of failed CPUs at step 470 in effect undoes the indication of additional CPUs at step 450, and allows the operating system kernel to complete the boot process of the operating system using the same number of CPUs as are physically present on the computing device 100. As indicated above, because various systems can initialize additional CPUs at various times, step 470 is not intended to be limited to occurring after all of the elements illustrated in step 465 have been performed. Rather, it is intended that step 470 be performed after the additional CPUs are initialized and the appropriate hardware bindings have been established, whenever that may occur. Proceeding with the flow diagram 400, at step 475, the operating system kernel can launch an appropriate subsystem to create the user mode environment and at step 480, once the user mode environment is created, the operating system can complete the boot process.

Once the boot process is completed at step 480, a virtual environment can be booted, such as by executing a virtual machine via commands entered through the operating system whose boot was completed at step 480. To create the virtual environment more efficiently, the state that was saved at step 460 during the boot of the operating system can be used. Because the saved state reflects the multiple CPUs presented at step 450, and does not take into account the indication of the failures of the secondary CPUs at step 470, the virtual environment can be booted as if the multiple CPUs are present. The virtual machine's environment can, therefore, in the manner shown below, take advantage of the mechanisms established by the host operating system to startup more efficiently.

Because, as indicated above, many operating systems will use only a single CPU until the boot process is nearly completed, that CPU is generally tasked with handling most or all of the system devices, including handling any communication, such as hardware interrupts, from those system devices. Consequently, an operating system on a computing device having multiple physical CPUs generally provides mechanisms by which processes executing on a CPU not used during the boot process can communicate with the CPU used during the boot process, so as to provide those processes the ability to communicate with hardware. FIG. 5 illustrates a mechanism that can leverage this capability to allow a virtual machine's environment to communicate with underlying hardware without having any runtime bindings to the hardware devices. Specifically, when the saved state is provided to the virtual environment, the virtual environment can be configured so that the CPU that would have been used during the boot process is not used or, at least, is not allowed to communicate with input/output hardware. Instead, the virtual environment can use the operating system's mechanisms to leverage the hardware bindings already performed for the operating system by behaving as if the computing device comprised multiple CPUs.

As an example, in a computing device having only a single CPU, the virtual operating system process will operate as if there is at least a second CPU because, while the operating system would have received an indication, at step 470, that the second CPU has failed, the virtual environment would not have received any such indication. Thus, while the single physical CPU in the computing device still performs all of work, the virtual machine's environment operates as if there exists a two CPU system, with one CPU having all of the runtime bindings to the hardware devices, and a second CPU hosting the virtual operating system process, which, because of the existence of the first CPU, does not need to be initialized with any runtime bindings to hardware. As a result, the virtual operating system can be booted efficiently because it does not need to initialize any hardware and the virtual machine itself can be started very efficiently because it does not need to abstract any hardware. If an extension hosted within the virtual operating system process requires communication with a hardware device, a request can be made from the virtual operating system process to the host operating system using the above described mechanisms established for use in multi-CPU systems. Thus, the extension can operate in a standard fashion, and the virtual environment can be created efficiently.

However, as will be known by those skilled in the art, for some extensions, such as operating system device drivers, the mechanism described above may not provide a satisfactory solution. Specifically, if the host operating system encounters legacy hardware, such as legacy device 199, it may not be able to locate an appropriate driver and may not recognize the hardware properly. Thus, while an appropriate virtual operating system process can host a legacy device driver, such as legacy interface 198, there may not be any way to communicate with the legacy hardware since, using the above described mechanisms, the operating system would handle all of the hardware communication, and the operating system would not have properly connected to the legacy hardware. Furthermore, even if the underlying operating system did properly connect to all of the computing device's hardware, some extensions, such as video device drivers, may not be able to operate properly with even the minimal amount of delay introduced into hardware communications using the above mechanisms.

Consequently, a variant of the above described mechanism contemplated by an embodiment of the present invention calls for the hardware device whose device driver will be hosted in a virtual operating system process to be identified during the boot sequence of the underlying operating system and bound, not to the underlying operating system, but to the virtual operating system process, providing the device driver direct access to that hardware device. More specifically, the hardware device's interrupts can be sent to a secondary CPU that is indicated, but is not physically present. Subsequently, when a virtual machine creates an environment assuming that the secondary CPU does exist, it will be able to initialize a runtime binding to the hardware device, allowing the virtual operating system process to communicate directly with the hardware device. Thus, as shown in FIG. 5, prior to the completion of the boot of the virtual environment at step 499, an optional step 495 can insert the hardware configuration of the legacy device 199 and can load the proper device driver, such as the legacy interface 198, in the virtual environment.

Alternatively, the virtual machine can create an environment with two or more virtual CPUs without relying on the above described boot optimization. Irrespective of the process used to create the multi-CPU virtual environment, a hardware device whose device driver is hosted by a virtual operating system process can be bound as if the hardware device was sending interrupts to a secondary CPU that is a virtual CPU. Thus, during the initial boot of the operating system, the hardware device whose driver should be hosted in a virtual environment can be hidden or delayed, as will be described in further detail below, so that the hardware device is not bound to the physical CPU that is loading the operating system. The virtual environment, however, as part of the boot process, can bind to the hardware device. As explained above, the virtual environment can be created as if at least a second CPU exists and the virtual environment is using it. Thus, the binding to the hardware device will be performed as if the hardware device was sending interrupts to the second CPU. Since only a single physical CPU exists, it may receive communications from the hardware device. However, those communications can be directed to the virtual environment rather than the host operating system, providing the virtual environment with direct access to the hardware device.

Embodiments of the present invention contemplate a number of mechanisms by which the hardware device whose driver should be hosted in a virtual operating system process can be hidden or delayed at step 465 of flow diagram 400. One mechanism contemplated by an embodiment of the present invention calls for the capture of any control information that may be sent, during step 465, to the device driver that should be hosted in a virtual operating system process. Such control information can be delayed until the virtual operating system process is established at step 490 and then relayed to the device driver. Another mechanism contemplated by an embodiment of the present invention calls for the device driver's proxy, which would be invoked by the operating system process in the manner described above with reference to host process 201 and proxy 205, to return an "OK" indication at step 465, and subsequently cache any Input/output Request Packets (IRPs) sent to it until the virtual operating system process was established at step 490. The proxy could then forward the IRPs to the device driver in the virtual operating system process. Alternatively, the proxy could simply delay until the virtual operating system process was established, and could then pass any IRPs directly to the device driver without requiring caching.

Yet another mechanism contemplated by an embodiment of the present invention calls for the hardware device to be initially bound to the operating system at step 465 and subsequently sent a "hibernate" or similar command that can cleanly flush any IRPs in the queue and leaving the hardware in a convenient state. The device driver in the virtual operating system process can then, at step 495, attempt to establish direct communication with the device from within the virtual operating system process. A variant of this mechanism contemplated by an embodiment of the present invention calls for the hardware device to be hidden from the operating system at step 465, rather than being bound and then hibernated, as described above. A hardware device can be hidden by sending appropriate commands to the HAL, or various other subsystems, such as a plug-and-play manager. Subsequently, after the operating system has booted at step 480 and the virtual operating system process has been established, the hardware device can be activated, or otherwise made visible at step 495, and can, thereby, bind itself to the virtual operating system process and the device driver hosted therein.

Figure 6:
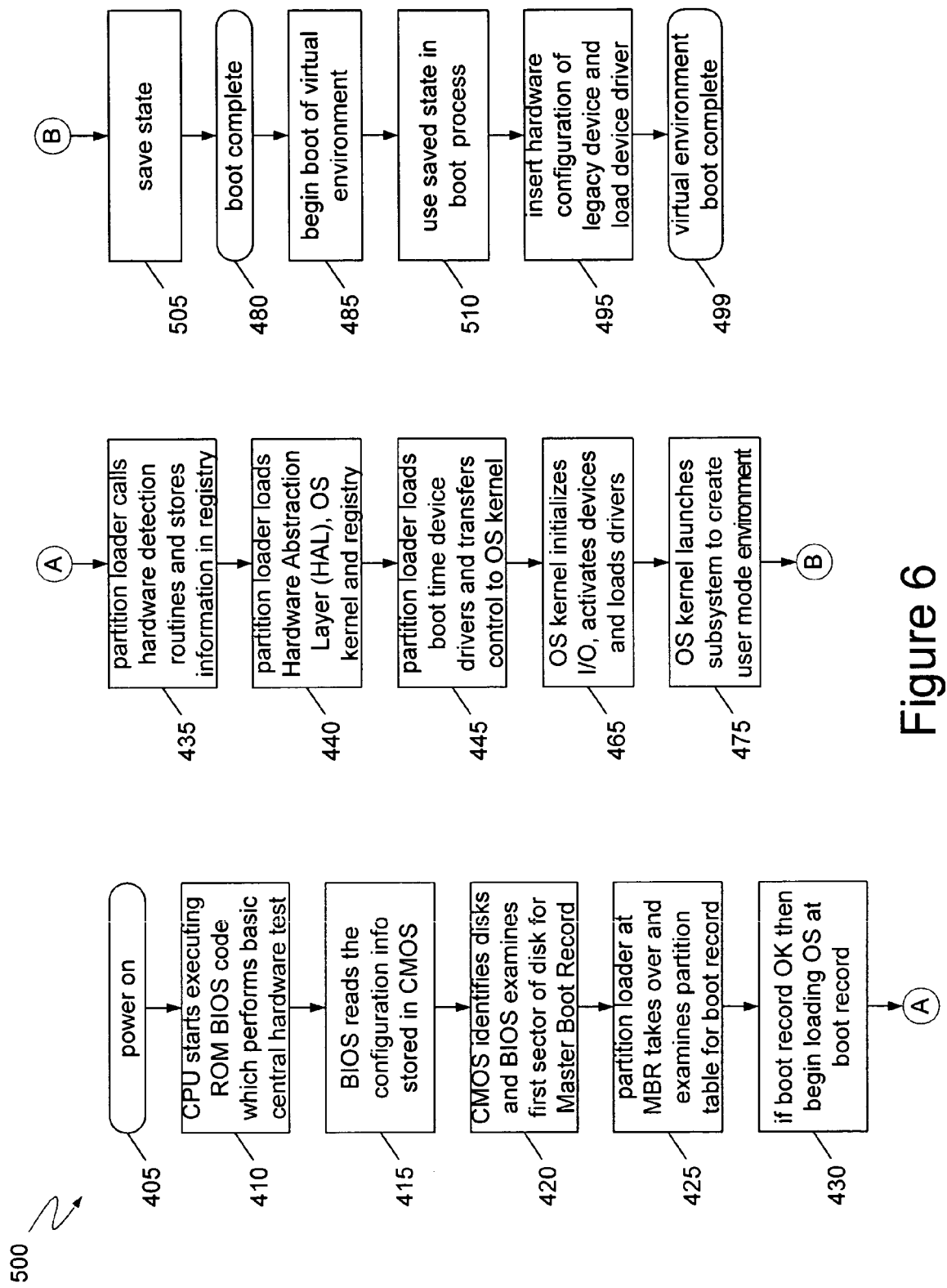
FIG. 6 is a flow diagram generally illustrating an alternative creation of a coherent state according to an embodiment of the present invention.

Rather than attempting to simulate additional CPUs to leverage the capabilities of multi-CPU operating systems in the manner described in detail above, an alternative mechanism for efficiently creating a virtual process contemplated by an embodiment of the present invention is generally illustrated in FIG. 6. Flow diagram 500 illustrated in FIG. 6 contains many of the same steps described in detail above with reference to FIG. 5. Specifically, steps 405 through 445 and 465 and 475 generally illustrate the same basic startup procedures as described in detail above. In addition, though not specifically illustrated in FIG. 6, the operating system kernel can, between steps 445 and 465, learn of the CPUs of the computing device, and can call the HAL to initialize those CPUs. However, unlike steps 450 and 455 illustrated in FIG. 5, the above described steps do not entail presenting a greater number of CPUs to the operating system kernel than, in fact, exist in the computing device. Subsequent to step 475, a new step 505 can be performed whereby the state of the computing device can be saved.

After the operating system boot has completed at step 485, a virtual machine can be launched, and the virtual machine can take advantage of the information gathered by the observation and recording code. Thus, at step 485, the virtual machine can begin the boot process and, at step 510, the virtual machine can use the state recorded at step 505 to more efficiently boot a virtual operating system process. More specifically, the virtual environment can use the parameters of only the particular hardware devices that it needs to virtualize, allowing it to skip other hardware devices. Furthermore, because the parameters have already been established and recorded during the operating system boot, such as at step 505, the virtual machine can virtualize those hardware devices more efficiently. If, however, a hardware device, such as legacy device 199, was not properly initialized at step 465, it can be initialized in the virtual environment at optional step 495, in the manner described in detail above. Ultimately, because the virtual machine can select a limited set of hardware devices to virtualize, and can virtualize them more efficiently, a virtual environment can be created more efficiently. However, as will be recognized by those skilled in the art, the above described optimization can be most effective if the booted operating system and the virtual operating system are identical, or at least similar in their interfaces with hardware.

In some cases, including certain hardware-device driver extensions that may be hosted by a virtual operating system process, the semantics of the support APIs provided by the virtual operating system process may not be useful. For example, some hardware device drivers can require access to the physical hardware in order to control it properly. Therefore, in these cases it will be necessary for the virtual operating system process to provide the hosted device drivers access to physical hardware. While some of the mechanisms described above may provide the necessary direct access, embodiments of the present invention contemplate additional mechanisms which can be applied to any virtual process to allow extensions hosted within that process to have direct access to hardware.

Consequently, the mechanisms described in detail below can be used, not only to provide fault isolation between an extension and a host process, but also to enable virtual machines to provide direct access to hardware in situations where abstracting the hardware may be inefficient or impossible. For example, the foregoing mechanisms can allow a virtual machine to host software that relies on hardware that the virtual machine has not been designed to abstract. As such, the foregoing mechanisms provide virtual machine designers and authors the ability to narrow the range of hardware they need to account for while still providing consumers the ability to use unique or legacy hardware.

Figure 7:
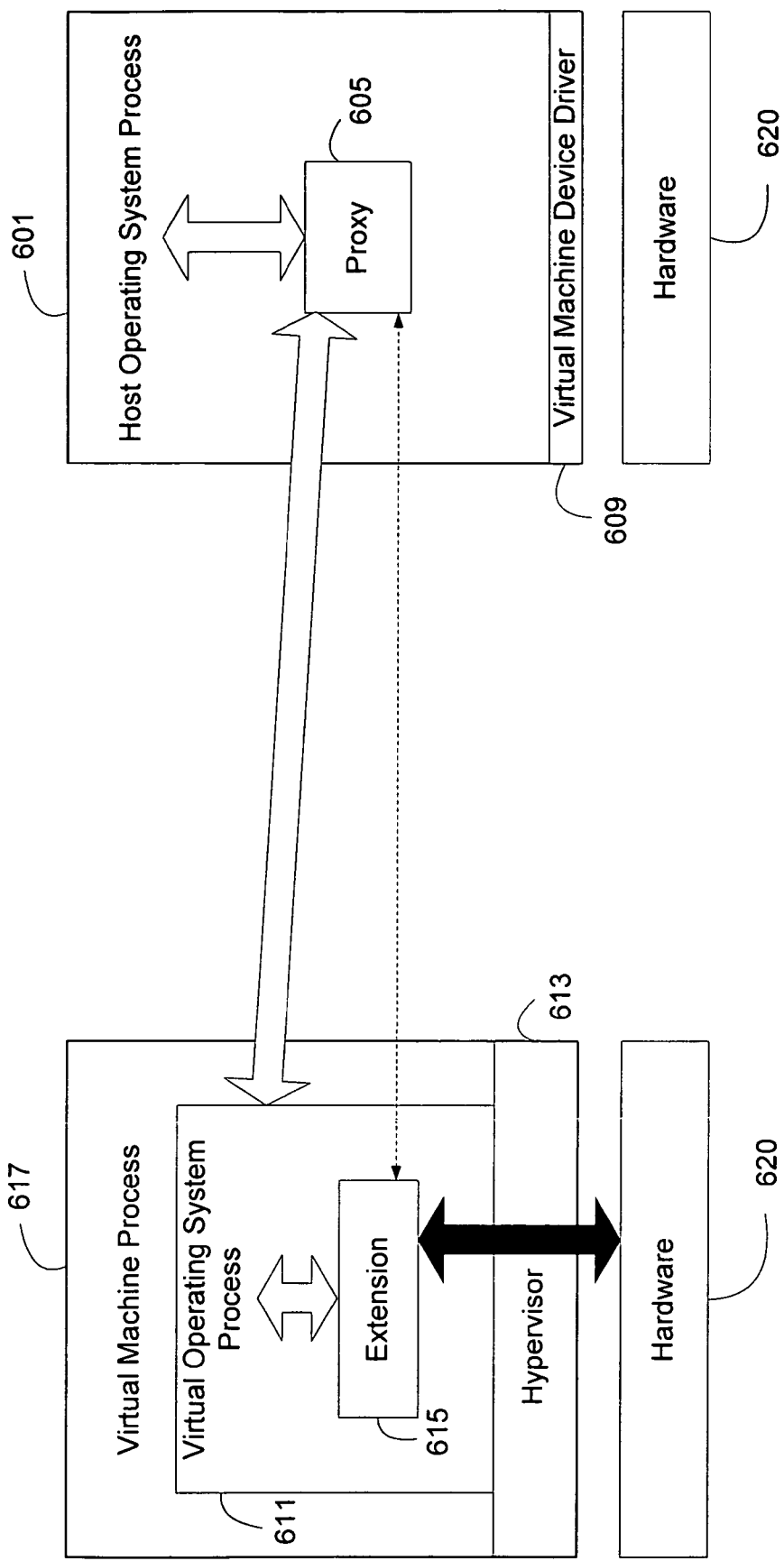
FIG. 7 is a block diagram generally illustrating an exemplary environment for providing extensions hosted within a virtual machine direct access to physical hardware according to an embodiment of the present invention.

Turning to FIG. 7, a virtual machine process 617 is shown, using a hypervisor 613 to interface with underlying hardware 620, and comprising an virtual operating system process 611 hosting an extension 615. As indicated by the black arrow, embodiments of the present invention contemplate a virtual machine environment such that the extension 615 can directly access the hardware 620 from within the virtual machine environment, bypassing any abstraction performed by the hypervisor 613. As explained above, a hypervisor, such as hypervisor 613, can be the computer executable instructions that manage a virtual machine environment by providing limited operating system functionality and by providing abstracted access to underlying hardware, such as the hardware 620. Thus, the hypervisor 613 can act to shield the virtual machine environment from the specifics of the underlying hardware, allowing the virtual machine software application to create an appropriate virtual machine environment for whatever code is intended to be executed within it. The hypervisor can then translate between the virtual machine environment and underlying hardware.

As an example, the virtual machine environment can present a particular type of CPU to the virtual operating system process 611, and any programs that might be executed within that process, while the underlying hardware 620 might, in fact, comprise an entirely different type of CPU. The hypervisor 613 can be tasked with translating the requests made to one type of CPU inside the virtual machine environment into the appropriate requests to communicate with the different type of CPU present in the underlying hardware 620. However, as explained above, because some operating system extensions, such as device drivers, may need to communicate directly with underlying hardware devices, the abstracting performed by the hypervisor can prevent such operating system extensions from operating properly. Consequently, embodiments of the present invention contemplate various mechanisms for bypassing the hypervisor and allowing extensions hosted within the virtual operating system process 611 to directly access hardware.

In addition to the virtual machine process 617, FIG. 7 also illustrates a host operating system process 601 that can also use the hardware 620. The hardware 620 is separated into two blocks to illustrate the above described timesharing between the host operating system process 601 and the virtual machine process 617. Thus, while the virtual machine process 617 is, via the hypervisor 613, executing on the hardware 620, the hardware 620 is not also simultaneously executing the host operating system process 601. Instead the underpinnings of the host operating system process 601 can have been removed and placed into temporary storage. While not illustrated in FIG. 7, such underpinnings can include registry entries, various control registers, interrupt dispatch routines, CPU privilege data, and the like. Once the virtual machine process 617 finishes executing on the hardware 620, the underpinnings of the virtual machine process can be removed and placed into temporary storage and the host operating system process 601 can be restored and allowed to execute on the hardware.

While FIG. 7 does illustrate the host operating system process 601, with the proxy 605, the mechanisms for providing direct access to hardware from within a virtual environment contemplated by embodiments of the present invention can be used outside of the context of extension fault isolation. Specifically, the foregoing mechanisms can be applied to virtual machine technology in general, allowing virtual machines to host extensions and other software that relies on legacy hardware devices, custom hardware devices, or atypical hardware devices. By removing the need to design an abstraction for such devices, embodiments of the present invention provide for simpler hypervisors, and more efficient virtual machine designs.

One mechanism for providing direct access to hardware from within a virtual machine environment contemplated by an embodiment of the present invention calls for the hypervisor to modify the page table mapping to allow access to the physical memory corresponding to one or more hardware devices. As will be known by those skilled in the art, an application or extension can communicate with hardware devices by accessing an appropriate physical memory, which can often be the registers or similar hardware located either on the hardware device itself or on an interface card. Thus, for example, the illustrative computing device 100 shown in FIG. 1 can allow a keyboard device driver to communicate with the keyboard 162 by providing the keyboard device driver access to the physical memory registers of the user input interface 160. Alternatively, the keyboard device driver can access a particular location in the RAM 132 and additional processes can transfer input from the keyboard 162 to that location in the RAM in order to be read by the device driver.

When code in a virtual machine environment, such as extension 615 in virtual machine process 617, seeks to access the underlying hardware, the hypervisor 613 can perform translations appropriate for the underlying hardware and can either access physical registers itself or, can store the data in the virtual machine process memory space, from which it can be read and copied to the appropriate physical registers by dedicated hardware or the like. To provide direct access to underlying hardware devices from within a virtual environment, the hypervisor can avoid performing any translations, since such translations may be improper, and instead the hypervisor can modify the page table mappings in such a manner that the necessary physical memory locations can be mapped into the appropriate memory space, such as the memory space used by the virtual operating system process 611. As explained in detail above, the page table mappings determine which physical memory locations are assigned to given processes. Thus, by modifying the page table mappings to place, into the virtual operating system process memory space, the physical memory locations corresponding to one or more devices, the hypervisor can allow extensions and applications using the virtual operating system to directly access hardware devices.

In one example, an extension 615, which can be a hardware device driver, and is being hosted by a virtual operating system process 611, can obtain direct access to a corresponding hardware device, that is part of the hardware 620, using known memory read and write operations. The hypervisor 613, which provides the hardware abstractions, can be designed to recognize the memory read and write operations from the extension 615 as operations which should not be translated or otherwise abstracted, and can allow them to pass through to the underlying hardware. Furthermore, because the hypervisor 613 can modify the page table mappings, as appropriate, the memory read and write operations can be physically performed on the intended registers or other physical memory locations corresponding to the hardware device that the extension 615 seeks to control. Consequently, the extension 615 has direct control over the memory registers or other physical memory locations corresponding to the hardware device and can, thereby, directly control the device even from within the virtual machine environment.

However, by changing the page table mappings, and allowing extensions to directly access hardware from within a virtual machine environment, the host operating system process 601 can become more exposed to any instability that may be introduced by the extension. For example, while the virtual machine process 617 is executing on the hardware 620, the extension 615 can directly access some component of the hardware 620 in an improper manner, causing that hardware component to behave improperly, or even become inoperable. Subsequently, after the host operating system process 601 has resumed execution on the hardware 620, the accessed hardware component can continue to behave improperly and possibly introduce instability into the host operating system process, or it can remain inoperable, and thereby prevent the host operating system process form performing a required task. Consequently, one mechanism contemplated by an embodiment of the present invention provides for limitations on the above described page table mapping modifications. For example, one limitation can be to modify the page table mapping only to the extent needed by the extension. Thus, if an extension only requires access to a very limited address range, possibly comprising the addresses of memory registers physically located on the hardware device, or on an interface to the device, then the page table mappings can be modified only to the extent necessary to map that limited address range into the virtual machine process memory space. Another limitation can be a temporal limitation, whereby the page table mappings can be modified only so long as to allow the extension to accomplish its task. For example, when the extension 615 attempts to communicate directly with hardware devices, it can make a request of the hypervisor 613 indicating the length of time for which it desires direct access. Such a request can be made directly, or through the virtual operating system process 611 that hosts the extension 615. Once the hypervisor 613 receives the request, it can modify the page table mappings for the requested length of time.

As will be known by those skilled in the art, many hardware devices are connected to a computing device through interface hardware, such as interface cards and the like. Often such interface hardware is attached to known bus mechanisms, such as those described above. Bus addresses can be mapped to physical memory which can further be accessed by software running on the computing device. Consequently, the registers of interface cards, and the like, that are connected to the bus are often referred to as "memory mapped registers", and can be mapped to one or more physical pages of memory. However, because a set of memory mapped registers rarely shares a physical page with another set of memory mapped registers, the above modifications to the page table mappings can be made on a per-device basis.

Furthermore, one mechanism contemplated by an embodiment of the present invention calls for the use of virtual address translation to allow certain memory mapped registers to be made available only to the virtual machine process 617. In such a manner, the host operating system process 601 can avoid dealing with hardware for which it may not have a proper device driver, and the proper device driver, which can be hosted within a virtual operating system process, can be granted permanent access to the particular hardware device.

Another mechanism for providing virtual machines direct access to hardware contemplated by an embodiment of the present invention allows input/output (I/O) ports to be accessed from within the virtual machine environment without emulation or other modifications performed by the hypervisor 613. As will be known by those skilled in the art, I/O ports are generally identified by an address, or port number, and can be accessed via known "IN" or "OUT" commands. For device drivers or other software applications to access hardware devices using I/O ports, the IN and OUT commands can either be forwarded, through software, to the physical ports or registers on the hardware device that were specified in the commands or, alternatively, they can be passed to the identified ports or registers directly from the device driver or other applications issuing the commands. Some types of CPUs allow for selective pass-through or direct access by using an I/O bitmap in the task segment, wherein the I/O bitmap specifies addresses for which the instructions can be passed through software and addresses for which the instructions can be sent directly to the physical ports or registers.

In normal operation, a virtual machine's hypervisor, such as hypervisor 613, will either trap on I/O instructions or will emulate I/O instructions to properly abstract the underlying hardware 620 for software within the virtual machine environment. If the hypervisor 613 traps on I/O instructions using, for example, a protection bitmap, one mechanism contemplated by an embodiment of the present invention calls for a modification of the protection bitmap to provide "holes", or I/O addresses for which the hypervisor will not trap. Thus, for example, if extension 615, which can be a device driver, requires direct access to hardware using a particular I/O address, then the protection bitmap can detect I/O instructions from within the virtual machine process 617, such as from the extension 615, that specify that I/O address, and the protection bitmap can allow those I/O instructions to pass through the hypervisor without trapping.

However, if the hypervisor 613 emulates I/O instructions, then a mechanism contemplated by an embodiment of the present invention calls for a modification of the hypervisor such that a check can be made prior to emulation and, for I/O instructions specifying particular addresses, no emulation will be performed. Thus, if, for example, the extension 615 requires direct access to hardware at a particular I/O address, the hypervisor 613 can check the I/O addresses specified in received I/O instructions, and if the received I/O instructions specify the particular address used by the extension, the hypervisor can allow those I/O instructions to pass through without emulation. In such a manner an extension can have direct access to hardware even from within a virtual machine environment.

As can be seen, the above described mechanisms can provide extensions and other software applications direct access to hardware through I/O ports even from within a virtual machine environment. However, if the extensions or other software applications are not designed to access hardware directly though I/O ports, and instead rely on the operating system to perform such hardware access, one mechanism contemplated by an embodiment of the present invention provides for a modification of the hypervisor 613 such that, when the virtual operating system process 611 detects a request from the extension 615, or other software application that would require the virtual operating system process to directly access hardware 620 through an I/O port, it can pass that request to the hypervisor, which can then perform the appropriate I/O instruction on behalf of the extension or other software application. Alternatively, the virtual operating system process 611 can perform the I/O instruction itself and the hypervisor 613 can let the instruction pass through, such as by using the mechanisms described in detail above.

Another mechanism often used to communicate with hardware is known as Direct Memory Access (DMA). As will be known by those skilled in the art, a DMA can allow a device driver, or other software application, to pass data to or from a hardware device without burdening the CPU. More specifically, a DMA provides for the transfer of data from one or more physical memory segments to the physical registers, or similar elements, of the hardware device itself. Such a transfer is coordinated by circuitry on the computing device, such as dedicated DMA chips, but does not require coordination by the CPU.

Generally, DMA requests can be part of the support API provided to an extension by an operating system or a software application. However, because the above described virtual support API can be provided by a virtual operating system process running within a virtual machine environment, the memory addresses specified by a DMA originating inside the virtual machine environment may not be the proper physical address to which the hardware device should be directed. This can be due to a number of factors, most notably that the DMA address may have been modified by the hypervisor as part of the hardware abstraction performed by the hypervisor. Consequently, for a DMA to be performed properly, the proper physical addresses can be used within the virtual machine environment.

One mechanism for providing the proper physical address for a DMA contemplated by an embodiment of the present invention calls for the hypervisor 613 or the virtual operating system process 611 to provide, to the extension 615, regions of memory that are suitable for DMA access by hardware. In addition, to protect against malicious or improper DMA requests, the hypervisor 613 can also block or otherwise deflect to proper addresses any DMA that points to addresses that should be protected. Protected addresses can, for example, be determined in advance such as when the hypervisor 613 is first executed on the hardware 620. Protected addresses can also simply be those addresses of memory that may not be capable of providing the support necessary for DMA communication with other hardware devices. As yet another alternative, protected addresses can be any or all of the addresses that are not participating in the current DMA request. Often preventing use of protected addresses in a DMA can be implemented by dedicated DMA chips, memory bus, or similar circuitry, on the computing device 100 itself. In such a case, the hypervisor 613 can learn of these blocks and use them, rather than attempting to block or deflect a DMA via a software solution.

In order to provide memory addresses suitable for DMA to the extension 615, one mechanism contemplated by an embodiment of the present invention calls for the hypervisor 613 to monitor the operation of the extension 615 and detect upcoming DMAs. Alternatively, the virtual operating system process 611 can monitor the extension's operation and either provide relevant information to the hypervisor 613, or the virtual operating system itself can detect upcoming DMAs. As explained above, extensions generally use support APIs to obtain access to various resources. Therefore, an upcoming DMA can be detected by monitoring the functions called by the extension 615 through the virtual support APIs provided by the virtual operating system process 611. Certain known functions are generally used to set up a DMA, such as, for example, a request to establish a block of memory or a request for a physical address of memory, Consequently, an extension requesting those functions from a virtual service API can be determined to be likely preparing to perform a DMA.

Rather than continually monitoring the virtual service API function calls made by the extension 615, the hypervisor 613, or virtual operating system process 611, can more efficiently detect a possible DMA by modifying the virtual support API to include an illegal instruction when the known functions generally used to set up a DMA are invoked. Such an illegal instruction can then generate a trap and alert the hypervisor or virtual operating system process to the upcoming DMA.

Once the hypervisor 613 or the virtual operating system process 611 becomes aware of an upcoming DMA, such as by using the above-described mechanisms, it can provide an appropriate range of memory addresses to the extension 615, allowing the DMA to proceed properly. In some cases, the hypervisor 613 can perform memory swapping or similar memory management in order to be able to provide an appropriate range of memory addresses. Alternatively, the hypervisor 613 can rely on known scatter/gather abilities of the host computing device to place into an appropriate memory range the information to be sent to, or received from, the hardware device via a DMA. However, because the extension 615 expects unusual addresses due to the translation generally performed by the hypervisor 613, it is unlikely that the further machinations described above will adversely impact the extension.

Once the memory addresses are provided to the extension 615, it may be necessary to prevent additional processes from accessing the memory at those addresses until the DMA has completed. As will be known by those skilled in the art, physical memory suitable for a DMA is generally not mapped out during the normal operation of the computing device. However, the memory within the virtual machine environment is almost always mapped out, usually by the hypervisor. Consequently, it can be necessary to protect the memory addresses passed to the extension in a manner that would not normally need to be done with memory allocated to other processes in the virtual machine environment. Such protection can be done by the hypervisor, which can use a mechanism commonly known as "pinning" to "pin down" the specified memory locations until the DMA has completed.

Of course, once a DMA has completed, the hypervisor can release, or "unpin", the specified memory locations. The completion of a DMA can be detected in much the same way that an upcoming DMA could be detected, which was explained in detail above. For example, the hypervisor 613 or virtual operating system process 611 could monitor the functions invoked by the extension 615. Functions such as a deallocation of the specified memory locations can indicate that the DMA has completed, and can be used as an indication that the hypervisor 613 can unpin the specified memory locations.

A further method of direct communication with hardware addressed by embodiments of the present invention relates to the delivery of hardware interrupts to code executing within a virtual machine environment. As will be known by those skilled in the art, a hardware interrupt can be a signal from a hardware device, sent to an appropriate device driver or other software application, that generally requires some sort of a response or acknowledgement. Because, as described above, the host operating system may not be able to support the proper device driver, or other control software, for a particular hardware device, the interrupt may need to be directed to an extension executing inside a virtual machine environment. For example, the computing device 100 of FIG. 1 is shown connected to a legacy device 199. If the operating system 134 is a modern operating system, it may not be able to properly support a device driver for the legacy device 199. Therefore, to enable a user of the computing device 100 to use the legacy device 199, a device driver, or similar control software, can be executed within a virtual environment. Consequently, any interrupts received from the legacy device 199 can only be properly handled if they are directed to the virtual machine process, and allowed to pass through to the device driver.

One mechanism for directing interrupts to an extension, such as extension 615, contemplated by an embodiment of the present invention calls for a received interrupt to be compared to table, or similar construct, to determine whether the virtual machine process 617 should handle the interrupt or pass it to the host operating system process 601. More specifically, in a computing device that has only a single CPU, interrupts can be received either when the virtual machine process 617 is executing on the CPU, or when the host operating system process 601 is executing on the CPU. The present mechanism can apply to the situation where the interrupt arrives while the virtual machine process 617 is executing on the CPU. In such a case, the hypervisor 613 can determine the reason or destination of the interrupt. The hypervisor 613 can then determine if the interrupt is appropriately handled by an extension in the virtual machine environment, such as extension 615, by, for example, performing a lookup in a table. If the interrupt is appropriately handled by the extension 615, the hypervisor 613 can pass the interrupt to the virtual machine process 617, and thereby to the extension. If the interrupt is appropriately handled by an extension or other software application associated with the host operating system process 601, the hypervisor 613 can complete the execution of the virtual machine process 617 on the hardware 620, and allow the host operating system process to resume execution on the hardware, and to the interrupt in an appropriate manner.

If the hypervisor 613 passes the interrupt into the virtual machine process 617, it may modify the number of the interrupt line on which the interrupt arrived in order to maintain compatibility with the virtual operating system process 611. Thus, when enabling an interrupt line, the hypervisor 613 can verify that the interrupt line information corresponds to a physical interrupt line. The hypervisor 613 can then translate between the physical interrupt line and an emulated interrupt line.

Because a virtual machine can emulate hardware that is different from the hardware 620 upon which the virtual machine process 617 is executing, the hypervisor 613 may need to emulate a single virtual machine instruction as multiple instructions on the host hardware. For example, if virtual machine is emulating a different type of CPU that the physical CPU on which it is being executed, instructions that may require only a single CPU cycle when performed by the CPU being emulated may require multiple CPU cycles when performed by the physical CPU. In such a case, it can be important for the hypervisor 613 to treat the multiple CPU cycles of the physical CPU in a unitary manner in order to maintain compatibility with the emulated CPU. Thus, if a hardware interrupt arrives while the hypervisor 613 is in the middle of executing a series of cycles on the physical CPU that correlate to a single cycle of the emulated CPU, the hypervisor can ignore, queue, or otherwise delay the interrupt until the series of CPU cycles has completed.

Further mechanisms for directing interrupts to an extension in a virtual machine process contemplated by an embodiment of the present invention call for the host operating system process to either delay the interrupt prior to transferring control to the virtual machine process, transfer control to the virtual machine process as soon as the interrupt is received, or attempt to execute the extension within the host process with appropriate pointers into the virtual machine process. As explained above, in a computing device that has only a single CPU, interrupts can be received either when the virtual machine process 617 is executing on the CPU, or when the host operating system process 601 is executing on the CPU. The present mechanisms can apply to the situation where the interrupt arrives while the host operating system process 601 is executing on the CPU. As an initial matter, the host operating system likely has predefined procedures for directing the interrupt to the appropriate device drivers. Such procedures can, for example, be established during the boot process of the host operating system, such as when the device drivers are loaded. The invocation of the extension 615 can, therefore, attempt to leverage these predefined procedures and indicate to the host operating system process 601 that interrupts received from a particular hardware device should be directed to the virtual machine process 617.

Consequently, when an interrupt that should be sent to the extension 615 is received while the host operating system process 601 is executing on the CPU, the host operating system process can perform procedures similar to those performed when it receives any other interrupt, with the exception that it can determine that the appropriate software to handle the interrupt is executing within the virtual machine process 617. The host operating system process 601 can then attempt to transfer the interrupt to the extension 615 by, for example, disabling interrupts, completing one or more tasks, switching execution to the virtual machine process 617, and then reenabling interrupts. Because the virtual machine process 617 will, therefore, be executing on the CPU when the interrupts are reenabled, the interrupt can received by the virtual machine process 617 and can be handled by it in the manner described in detail above.

As will be known by those skilled in the art, hardware devices can generally use two different kinds of interrupts: a permanent interrupt that remains active until it is dealt with, or responded to, and a transient interrupt that can throw a latch and then end. Using the above-described mechanism, the virtual machine process 617 can detect a permanent interrupt as soon as the interrupts are reenabled, since the permanent interrupt was never deactivated. Thus, for a permanent interrupt, the virtual machine process 617 can use the mechanisms described in detail above to handle the interrupt in the same manner as if it had originally arrived while the virtual machine process was executing on the CPU. For a transient interrupt, however, the latch, which can indicate that an interrupt has occurred, may become undone. Consequently, unless another interrupt occurs to re-throw the latch, the virtual machine process 617 may never learn of the interrupt if it occurred while the host operating system process 601 was executing on the CPU. Thus, the host operating system process 601 can track, or otherwise store, one or more transient interrupts which occur prior to the transfer of execution to the virtual machine process 617. The host operating system process 601 can pass information to the hypervisor 613 to inform the hypervisor that a transient interrupt has occurred, and can provide the number of transient interrupts, if appropriate. Once the virtual machine process 617 is executing on the CPU, the hypervisor 613 can then emulate the transient interrupts in turn, and allow the extension 615 to respond to them in kind. Once the hypervisor 613 has completed emulating the transient interrupts, it can then reenable interrupts.

In some cases, hardware interrupts may need to be handled, or responded to, with greater speed that the above procedures can provide. In such a case, a mechanism contemplated by an embodiment of the present invention calls for the host operating system process 601 to immediately transfer execution to the virtual machine process 617 when an interrupt is detected that is properly handled by an extension running in the virtual machine process, such as extension 615, rather than disabling interrupts and attempting to complete one or more tasks using the above described mechanisms. However, hypervisor 613 may be single threaded, which can delay the detection of the interrupt, and consequently the servicing of the interrupt, if the hypervisor is waiting for a response or some other information.

To avoid delay due to the single threaded nature of a hypervisor, a variant of the above mechanism also contemplated by an embodiment of the present invention calls for the hypervisor 613 to emulate a multiple-CPU computing device and for the virtual operating system process 611 to be capable of operating in a multiple-CPU environment. In addition, the hypervisor 613 can structure the execution of instructions in such a manner that at least one emulated CPU is preserved in a state that it can accept interrupts. For example, as described above, the virtual machine process 617 can be called from the host operating system process 601 by passing a command to the virtual machine process, and then caching the underpinnings of the host operating system process and executing the virtual machine process on the hardware 620. The hypervisor 613 can preserve one emulated CPU in a state that it can accept interrupts by passing commands received from the host operating system process 601 to other emulated CPU. Consequently, because the preserved CPU is not allowed to handle commands from the host operating system process 601, it can maintain a state in which it can immediately handle a received interrupt.

Consequently, if an interrupt were to arrive while the underlying host operating system process 601 was executing on the hardware 620, and the interrupt requires low latency, the host operating system process can transfer control to the virtual machine process 617 as quickly as possible. Once the virtual machine process 617 begins executing on the hardware 620, at least one emulated CPU of the virtual machine process is in a state in which it can accept the interrupt. Thus, even if other emulated CPUs were in a state in which they were performing a function, or waiting for a response, the interrupt can be handled in an efficient manner by the at least one emulated CPU that was reserved for interrupts. The hypervisor 613 and virtual operating system process 611 can then perform the necessary steps to deliver the interrupt to the appropriate software, such as extension 615, in the manner described in detail above. Furthermore, because the hypervisor 613 may require that physical memory be pinned, as also described above, the emulated CPU that received the interrupt can be allowed to complete the handling of the interrupt prior to returning control to another emulated CPU or to another process. In such a manner, at least one emulated CPU can be reserved for prompt handling of interrupts.

Another mechanism providing low latency handling of hardware interrupts contemplated by an embodiment of the present invention calls for the host operating system process 601 to fetch the code for an interrupt service routine from the extension 615 and execute the code itself, with appropriate data pointers back into the virtual machine process 617. For example, the host operating system process 601 can trace out the appropriate interrupt service routines from the beginning of the memory space of the virtual machine process 617. Once located, those interrupt service routines can be copied into the host operating system process 601 and executed there in order to handle the interrupt with very low latency.

Because the interrupt service routines were intended to be executed within the process space of the virtual machine process 617, the host operating system process 601, when it copies those routines and executes them, can provide data pointers back into the virtual machine process so that the routines can operate properly. For example, the host operating system process 601 can change the appropriate instructions of the interrupt service routines, or the page table mappings, to reference memory within the virtual machine process 617. Known software fault isolation techniques can be used to modify the appropriate instructions, and to provide a measure of fault isolation. As will be known by those skilled in the art, the execution of software can be monitored by inserting appropriate commands between the commands of the software being monitored. To avoid the need to recompile the software being monitored, the inserted commands can be low level commands that can be inserted into compiled code. For example, a low level instruction to access a particular memory location by copying that location's contents to a register of a processor can be preceded by an inserted instruction that checks the address of the memory location being accessed, such as by comparing the address to a known range of addresses. If the memory location is an improper location, for example, if it is outside of an appropriate range of addresses, a modification can be made to substitute an appropriate address into the access request. In such a manner, each memory access instruction can be modified to access a correct memory location, despite the fact that the interrupt handling routine may be executing in the host operating system process 601 instead of the virtual machine process 617.

As indicated, software fault isolation techniques can also provide a measure of fault isolation despite the execution of interrupt handling routines directly in the host operating system process 601. For example, one aspect of software fault isolation is achieved by inserting low level instructions before each memory write instruction to ensure that the location to which the write instruction is directed is a proper location. As will be known by those skilled in the art, software faults often cause instability because the fault resulted in data being written into an improper memory location. Furthermore, such improper write instructions can be difficult to detect because the address to which the data will be written may not be determined until the completion of the immediately preceding instruction. By inserting the above described instructions immediately prior any memory writes, the memory addresses to which such write instructions are directed can be checked, such as, for example, by comparing them to a known range of memory addresses. An indication that the write is directed to a memory location outside of the known range can, therefore, indicate that the write instruction is improper and may cause instability. Consequently, the write instruction can be modified or aborted, and a measure of fault isolation can be achieved. Further aspects of software fault isolation also be used, including sandbox control flow, the use of privileged instructions, and the like. Additional information regarding the various aspects of software fault isolation, including those described above, can be found in U.S. Pat. No. 5,761,477 to Wahbe et al., whose contents are herein incorporated by reference in their entirety to further explain or describe any teaching or suggestion contained within the present specification that is consistent with their disclosures.

However, certain computing devices can have multiple physical CPUs, in which case some of the above mechanisms may not be necessary. For example, in a computing device with multiple physical CPUs, a single physical CPU may always be executing the virtual machine process 617. In such a case, one mechanism contemplated by an embodiment of the present invention calls for the controlling mechanism of hardware interrupts, which can often be dedicated circuitry that is part of the computing device itself, to direct all interrupts that require an extension, such as extension 615, to be directed to the physical CPU on which the virtual machine process 617 is always running. Even if the virtual machine process 617 shares a physical CPU with other processes, but always shares the same physical CPU, directing all interrupts that require extension 615 to that physical CPU can still provide an optimal solution when combined with the above described mechanisms for transferring interrupts to the appropriate virtual machine process, even if it is not currently executing on the physical CPU.

However, if the virtual machine process 617 can be executing on any one of the multiple physical CPUs, then inter-processor messages can be used to allow any processor to respond to a hardware interrupt. For example, if the virtual machine process 617 happens to be executing on a first physical CPU and an interrupt arrives at a second physical CPU that can be handled by extension 615, the second physical CPU can communicate the relevant information to the first physical CPU to allow the extension to handle the hardware interrupt. As will be known by those skilled in the art, it can be very difficult to physically forward a hardware interrupt from one physical CPU to another. Consequently, by using inter-processor messages, the interrupt can be handled as if it arrived at the proper physical CPU.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. Similarly, it should be recognized that mechanisms described in the context of a virtual machine environment may be applicable to virtual environment created on top of a common operating system, and vice versa. For example, the software fault isolation techniques described above in conjunction with virtual machine environments can be equally applied to any situation where excessive context switching may be undesirable, including extension routines copied from a virtual process to a host process even when both processes share a common underlying operating system. Therefore, the invention as described herein contemplates all such embodiments as may come within the scope of the following claims and equivalents thereof.

What is claimed is:

1. A method of creating a virtual operating system environment, the method comprising steps of:
    beginning a boot of an operating system environment on a computing device having a processor;
    indicating to the processor, during the boot of the operating system environment, that the computing device has another processor, wherein said another processor is inaccessible by said virtual operation system environment;
    saving a state during the boot of the operating system environment after the processor and said another processor have been initialized;
    indicating to the operating system environment, after the operating system environment has completed at least one component binding associated with the processor, that said another processor has failed;
    providing, to the virtual operating system environment, the saved state;
    booting the virtual operating system environment using the saved state, wherein the booting of the virtual operating system environment comprises preventing the processor from accessing at least one component associated with the at least one component binding;
    providing, to virtual operating system environment, an access to the at least one component binding using a preexisting support, wherein said preexisting support provides, to said another processor, the access to the at least one component binding; and
    creating during said booting of the virtual operating system environment, a specified component binding in the virtual operating system environment to a specified component, wherein the specified component interfaces with a device driver hosted within the virtual operating system environment and the creating of the specified component binding comprises:
    binding the specified component to the operating system environment;
    hibernating the specified component, wherein the hibernating cleanly flushes communication queues related to the specified component; and
    binding the specified component to the virtual operating system environment.

2. The method of claim 1, wherein the booting of the virtual operating system environment further comprises:
    relying on the at least one component binding associated with the processor; and
    completing the boot of the virtual operating system environment using said another processor.

3. The method of claim 1, wherein the creating of the specified component binding comprises: caching communication related to the specified component; and providing the cached communication to the virtual operating system environment.

4. A computer readable storage medium storing computer executable instructions for creating a virtual operating system environment, the computer readable storage medium having the computer executable instructions that, when executed by a processor of a computing system, cause the computing system to perform steps comprising:
    beginning a boot of an operating system environment on a computing device having a processor;
    indicating to the processor, during the boot of the operating system environment, that the computing device has another processor;
    saving a state during the boot of the operating system environment after the processor and said another processor have been initialized;
    indicating to the operating system environment, after the operating system environment has completed at least one component binding associated with the processor, that said another processor has failed;
    providing, to the virtual operating system environment, the saved state;
    booting the virtual operating system environment using the saved state, wherein the booting of the virtual operating system environment comprises preventing the processor from accessing at least one component associated with the at least one component binding;
    providing, to the virtual operating system environment, an access to the at least one component binding using a preexisting support, wherein said preexisting support provides, to said another processor, the access to the at least one component binding; and
    creating, during said booting of the virtual operating system environment, a specified component binding in the virtual operating system environment to a specified component, wherein the specified component interfaces with a device driver hosted within the virtual operating system environment and the creating of the specified component binding comprises:
- binding the specified component to the operating system environment;
- hibernating the specified component, wherein the hibernating cleanly flushes communication queues related to the specified component; and
- binding the specified component to the virtual operating system environment.

5. The computer readable storage medium of claim 4, wherein the booting of the virtual operating system environment further comprises:
- relying on the at least one component binding associated with the processor; and
- completing the boot of the virtual operating system environment using said another processor.

6. The computer readable storage medium of claim 4, wherein the computer executable instructions for creating the specified component binding further comprise computer executable instructions for: capturing control information for the specified component; and providing the control information to the device driver hosted within the virtual operating system environment.

7. The computer readable storage medium of claim 4, wherein the computer executable instructions for creating the specified component binding comprise computer executable instructions for:
- establishing, in the operating system environment, a proxy corresponding to the device driver in the virtual operating system environment;
- caching, by the proxy, input/output packets delivered to the operating system environment; and
- transmitting, by the proxy, the cached input/output packets to the device driver in the virtual operating system environment.

8. A system for creating a virtual operating system environment, the system comprising:
- at least one processor;
- at least one memory communicatively coupled to said at least one processor, the memory having stored therein computer-executable instructions that, when executed by said at least one processor, cause the system to perform steps comprising:
- beginning a boot of an operating system environment on a computing device having a processor;
- indicating to the processor, during the boot of the operating system environment, that the computing device has another processor;
- saving a state during the boot of the operating system environment after the processor and said another processor have been initialized;
- indicating to the operating system environment, after the operating system environment has completed at least one component binding associated with the processor, that said another processor has failed;
- providing, to the virtual operating system environment, the saved state;
- booting the virtual operating system environment using the saved state, wherein the booting of the virtual operating system environment comprises preventing the processor from accessing at least one component associated with the at least one component binding;
- providing, to the virtual operating system environment, an access to the at least one component binding using a preexisting support, wherein said preexisting support provides, to said another processor, the access to the at least one component binding; and
- creating, during said booting of the virtual operating system environment, a specified component binding in the virtual operating system environment to a specified component, wherein the specified component interfaces with a device driver hosted within the virtual operating system environment and the creating of the specified component binding comprises:
- binding a specified component to the operating system environment;
- hibernating the specified component, wherein the hibernating cleanly flushes communication queues related to the specified component; and
- binding the specified component to the virtual operating system environment.

9. The system of claim 8, wherein the booting of the virtual operating system environment further comprises:
- relying on the at least one component binding associated with the processor; and
- completing the boot of the virtual operating system environment using said another processor.

10. The system of claim 8, wherein the creating of the specified component binding comprises: caching communication related to the specified component; and providing the cached communication to the virtual operating system environment.

11. The system of claim 8, wherein the creating of the specified component binding further comprises: capturing control information for the specified component; and providing the control information to the device driver hosted within the virtual operating system environment.

12. The system of claim 8, wherein the creating of the specified component binding comprises:
- establishing, in the operating system environment, a proxy corresponding to the device driver in the virtual operating system environment;
- caching, by the proxy, input/output packets delivered to the operating system environment; and
- transmitting, by the proxy, the cached input/output packets to the device driver in the virtual operating system environment.

* * * * *